US011941737B2

(12) United States Patent
Wang et al.

(10) Patent No.: US 11,941,737 B2
(45) Date of Patent: Mar. 26, 2024

(54) ARTIFICIAL INTELLIGENCE-BASED ANIMATION CHARACTER CONTROL AND DRIVE METHOD AND APPARATUS

(71) Applicant: Tencent Technology (Shenzhen) Company Limited, Guangdong (CN)

(72) Inventors: Sheng Wang, Guangdong (CN); Xing Ji, Guangdong (CN); Zhantu Zhu, Guangdong (CN); Xiangkai Lin, Guangdong (CN); Linchao Bao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 149 days.

(21) Appl. No.: 17/486,641

(22) Filed: Sep. 27, 2021

(65) Prior Publication Data
US 2022/0012930 A1 Jan. 13, 2022

Related U.S. Application Data

(63) Continuation of application No. PCT/CN2020/105673, filed on Jul. 30, 2020.

(30) Foreign Application Priority Data

Aug. 30, 2019 (CN) .................... 201910816780.X

(51) Int. Cl.
*G06T 15/00* (2011.01)
*G06T 13/40* (2011.01)
(Continued)

(52) U.S. Cl.
CPC .............. *G06T 13/40* (2013.01); *G06T 13/80* (2013.01); *G06T 17/20* (2013.01); *G06T 19/20* (2013.01);
(Continued)

(58) Field of Classification Search
CPC ....... G06V 40/176; G06T 19/20; G06T 13/40; G06T 17/20; G06T 13/80; G06T 2219/2016
(Continued)

(56) References Cited

U.S. PATENT DOCUMENTS 6,950,104 B1 9/2005 Marschner et al.
9,799,096 B1 10/2017 De la Torre et al.
(Continued)

FOREIGN PATENT DOCUMENTS

CN 104217454 A 12/2014
CN 105528805 A 4/2016
(Continued)

OTHER PUBLICATIONS

Joshi P, Tien WC, Desbrun M, Pighin F. Learning controls for blend shape based realistic facial animation. In ACM Siggraph 2006 Courses Jul. 30, 2006 (pp. 17-es).*
(Continued)

*Primary Examiner* — Phu K Nguyen
(74) *Attorney, Agent, or Firm* — Crowell & Moring LLP

(57) ABSTRACT

Embodiments of this application disclose an artificial intelligence-based (AI-based) animation character control method. When one animation character has a corresponding face customization base, and one animation character has no corresponding face customization base, the animation character having the face customization base may be used as a driving character, and the animation character having no face customization base may be used as a driven character. The method may include: obtaining an expression base corresponding to the driving character and an expression base corresponding to the driven character; determining a mapping relationship between expression parameters according to the expression base corresponding to the driv-
(Continued)

ing character and the expression base corresponding to the driven character; and driving the driven character according to the mapping relationship by using the known expression parameter of the driving character and the foregoing mapping relationship, so that the driven character is driven to make an actual expression identified by the known expression parameter. Therefore, a new animation character may be directly driven by using a known expression parameter of another animation character without performing processing to obtain a face customization base corresponding to the new animation character, thereby increasing the speed of launching the new animation character.

19 Claims, 11 Drawing Sheets

(51) Int. Cl.
    *G06T 13/80*     (2011.01)
    *G06T 17/20*     (2006.01)
    *G06T 19/20*     (2011.01)
    *G06V 40/16*     (2022.01)

(52) U.S. Cl.
    CPC .... *G06V 40/176* (2022.01); *G06T 2219/2016* (2013.01)

(58) Field of Classification Search
    USPC .......................................................... 345/418
    See application file for complete search history.

(56) References Cited

U.S. PATENT DOCUMENTS

| | | | |
|---|---|---|---|
| 10,198,845 B1* | 2/2019 | Bhat | G06V 40/176 |
| 10,860,838 B1* | 12/2020 | Elahie | A63F 13/655 |
| 11,475,608 B2* | 10/2022 | Theobald | G06V 40/174 |
| 2004/0095344 A1 | 5/2004 | Dojyun et al. | |
| 2016/0163084 A1 | 6/2016 | Corazza et al. | |
| 2018/0005448 A1 | 1/2018 | Choukroun et al. | |
| 2019/0266796 A1 | 8/2019 | Comer | |
| 2020/0051303 A1* | 2/2020 | Li | G06N 3/045 |
| 2021/0012097 A1* | 1/2021 | Velthuis | G06V 40/172 |
| 2022/0005249 A1* | 1/2022 | Choi | G06T 17/20 |
| 2023/0035282 A1* | 2/2023 | Huang | G06V 40/174 |

FOREIGN PATENT DOCUMENTS

| | | |
|---|---|---|
| CN | 106709975 A | 5/2017 |
| CN | 107633542 A | 1/2018 |
| CN | 108874114 A | 11/2018 |
| CN | 108876879 A | 11/2018 |
| CN | 109493403 A | 3/2019 |
| CN | 109961496 * | 7/2019 |
| CN | 109961496 A | 7/2019 |
| CN | 110517339 A | 11/2019 |
| JP | 2001 043345 A | 2/2001 |
| JP | 2002-123837 A | 4/2002 |
| JP | 2002-298155 A | 10/2002 |
| KR | 10-2019-0021390 | 3/2019 |

OTHER PUBLICATIONS

Alexa M, Behr J, Müller W. The morph node. InProceedings of the fifth symposium on Virtual reality modeling language (Web3D-VRML) Feb. 21, 2000 (pp. 29-34).*
Cao C, Weng Y, Lin S, Zhou K. 3D shape regression for real-time facial animation. ACM Transactions on Graphics (TOG). Jul. 21, 2013;32(4):1-0.*
Seol Y, Lewis JP, Seo J, Choi B, Anjyo K, Noh J. Spacetime expression cloning for blendshapes. ACM Transactions on Graphics (TOG). Apr. 30, 2012;31(2):1-2.*
Pighin F, Hecker J, Lischinski D, Szeliski R, Salesin DH. Synthesizing realistic facial expressions from photographs. InAcm siggraph 2006 courses Jul. 30, 2006 (pp. 19-es).*
International Search Report dated Nov. 12, 2020 for International Application No. PCT/CN2020/105673.
Kihara et al.; "A Dynamic Facial Expression Database for Quantitative Analysis of Facial Paralysis"; 2011 6th International Conference on Computer Sciences and Convergence Information Technology (ICCIT); Nov. 29, 2011; pp. 949-952.
Wang et al.; "Facial Expression Recognition based on Deep Learning and Traditional Machine Learning"; Applied Science and Technology, vol. 45, No. 1; Feb. 2018; pp. 65-72.
Office Action dated Oct. 12, 2020 for Chinese Application No. 201910816780.x; 6 pages.
Office Action dated Mar. 1, 2021 for Chinese Application No. 201910816780.x; 5 pages.
Extended European Search Report of European application 20857359.2 dated Jul. 26, 2022, 12 pages.
Aneja, Deepali et al., "Modeling Stylized Character Expressions via Deep Learning", Department of Computer Science and Engineering, University of Washington, Seattle, WA, USA, Springer International Publishing AG 2017.
Chauduri, Bindita et al., "Joint Face Detection and Facial Motion Retargeting for Multiple Faces", 2019 IEEE/CVF Conference on Computer Vision and Pattern Recognition (CVPR), 10 pages.
Ribera, Roger Blanco et al., "Facial Retargeting with Automatic Range of Motion Alignment", ACM Transactions on Graphics, vol. 36, No. 4, Article 154, Jul. 2017, 12 pages.
Notice of Reasons for Refusal issued on Japanese appliction No. 2021-560989 dated Nov. 18, 2022, 7 pages, in Japanese language.
English language translation of Notice of Reasons for Refusal issued on Japanese application No. 2021-560989 dated Nov. 18, 2022, 7 pages.
Office Action issued on Korean application No. 10-2021-7029446 dated Dec. 22, 2022, 7 pages, in Korean language.
English language summary of Korean Office Action for application No. 10-2021-7029446, 4 pages.

* cited by examiner

ARTIFICIAL INTELLIGENCE-BASED ANIMATION CHARACTER CONTROL AND DRIVE METHOD AND APPARATUS

RELATED APPLICATION

This application is a continuation of and claims priority to the International PCT Application No. PCT/CN2020/105673 filed with the China National Intellectual Property Administration on Jul. 30, 2020, which claims priority to Chinese Patent Application No. 201910816780.X also filed with the China National Intellectual Property Administration on Aug. 30, 2019, both of which are entitled "ARTIFICIAL INTELLIGENCE-BASED ANIMATION CHARACTER CONTROL METHOD AND APPARATUS" and are incorporated herein by reference in their entireties.

FIELD OF THE TECHNOLOGY

This application relates to the field of data processing, and in particular, to an artificial intelligence-based (AI-based) animation character drive technology.

BACKGROUND OF THE DISCLOSURE

Currently, human-computer interactions have become relatively common. A user may interact with an animation character, and during interaction, the user may enter any segment of speech. Correspondingly, a drive network (such as a drive neural network or a drive circuitry) may drive an animation character to make a mouth shape corresponding to the segment of speech. In this scenario, the existence of the animation character can greatly augment a sense of reality, improve expressiveness, and bring more immersive experience to the user. An animation character may be obtained in a plurality of manners, for example, is manually designed by a designer.

When an animation character is driven by the drive network, the animation character usually needs to have a corresponding expression base (alternatively referred to as facial expression base) and a corresponding face customization base. The expression base is formed by deformable meshes representing different expressions, and each deformable mesh is formed by changing a three-dimensional (3D) model of the animation character under different expressions. The face customization base is formed by deformable meshes representing different face shapes, each deformable mesh represents a face that changes substantially relative to an average facial shape, and faces in the face customization base need to be related to the animation character.

For some newly created animation characters, a designer may manually design 3D meshes of the animation characters. Because the expression base has strict semantic information, such as performing control to close the eyes or mouth, the expression base may be conveniently obtained through manual modeling by the designer. However, the face customization base is obtained by decomposing a large amount of face data through principal component analysis (PCA) in comparison to average face, and thus does not have clear semantic information and has an inaccurate association with a mesh vertex of a model. Therefore it is difficult to obtain the face customization base through manual design. As a result, a corresponding face customization base may be determined through only complex data processing, and consequently the launch of a new animation character is delayed.

SUMMARY

To resolve the foregoing technical problems, this application provides an artificial intelligence-based (AI-based) animation character drive method and apparatus, to directly drive a new animation character by using a known expression parameter of another animation character without performing processing to obtain a face customization base corresponding to the new animation character, thereby increasing the speed of launching the new animation character.

The following technical solutions are disclosed in embodiments of this application:

According to a first aspect, an embodiment of this application provides an AI-based animation character control and drive method, performed by a processing device, the method including:

obtaining an expression base corresponding to a driving character and an expression base corresponding to a driven character, the driving character having a corresponding face customization base, the driven character having no corresponding face customization base;

determining a mapping relationship between an expression parameter corresponding to the driving character and an expression parameter corresponding to the driven character according to the expression base corresponding to the driving character and the expression base corresponding to the driven character; and driving the driven character according to the expression parameter corresponding to the driving character and the mapping relationship.

According to a second aspect, an embodiment of this application provides an AI-based animation character control apparatus. The apparatus includes an obtaining unit, a determining unit, and a drive unit:

the obtaining unit being configured to obtain an expression base corresponding to a driving character and an expression base corresponding to a driven character, the driving character having a corresponding face customization base, the driven character having no corresponding face customization base;

the determining unit being configured to determine a mapping relationship between an expression parameter corresponding to the driving character and an expression parameter corresponding to the driven character according to the expression base corresponding to the driving character and the expression base corresponding to the driven character; and the drive unit being configured to drive the driven character according to the expression parameter corresponding to the driving character and the mapping relationship.

According to a third aspect, an embodiment of this application provides an AI-based animation character control method, performed by a processing device, the method including:

obtaining a deformation base corresponding to a driving character and a deformation base corresponding to a driven character, the driving character having a corresponding structural base, the driven character having no corresponding structural base, the structural base being used for identifying structural features of a corresponding character, the deformation base being used for identifying deformation features of a corresponding character;

determining a mapping relationship between a deformation parameter corresponding to the driving character and a deformation parameter corresponding to the driven character according to the deformation base corresponding to the driving character and the deformation base corresponding to the driven character; and driving the driven character according to the deformation parameter corresponding to the driving character and the mapping relationship.

According to a fourth aspect, an embodiment of this application provides an AI-based animation character control apparatus. The apparatus includes an obtaining unit, a determining unit, and a drive unit:

the obtaining unit being configured to obtain a deformation base corresponding to a driving character and a deformation base corresponding to a driven character, the driving character having a corresponding structural base, the driven character having no corresponding structural base, the structural base being used for identifying structural features of a corresponding character, the deformation base being used for identifying deformation features of a corresponding character;

the determining unit being configured to determine a mapping relationship between a deformation parameter corresponding to the driving character and a deformation parameter corresponding to the driven character according to the deformation base corresponding to the driving character and the deformation base corresponding to the driven character; and the drive unit being configured to drive the driven character according to the deformation parameter corresponding to the driving character and the mapping relationship.

According to a fifth aspect, an embodiment of this application provides a device, the device including a processor and a memory, the memory being configured to store program code and transmit the program code to the processor; and the processor being configured to perform the method according to the first aspect or the third aspect according to instructions in the program code.

According to a sixth aspect, an embodiment of this application provides a non-transitory computer-readable storage medium, configured to store program code, the program code being used for performing the method according to the first aspect or the third aspect.

According to a seventh aspect, an embodiment of this application provides a computer program product including instructions, the instructions, when being run on a computer, causing the computer to perform the method according to the first aspect or the third aspect.

It can be understood from the foregoing technical solutions that, when one animation character has a corresponding face customization base, and one animation character has no corresponding face customization base, the animation character having the face customization base may be used as a driving character, and the animation character that has no face customization base may be used as a driven character. There is a mapping relationship between an expression parameter corresponding to the driving character and an expression parameter corresponding to the driven character. Therefore, after the mapping relationship is determined, the driven character may be directly driven by using the expression parameter corresponding to the driving character even if the driven character has no face customization base. The driven character may be driven, according to an actual expression parameter corresponding to the driving character, to make an actual expression, and the actual expression parameter may reflect a degree of correlation between the actual expression and an expression base under different dimensions, that is, an actual expression parameter corresponding to the driven character may also reflect a degree of correlation between an actual expression of the driven character and an expression base under different dimensions. Therefore, a mapping relationship between the expression parameters may be determined based on an association relationship between the foregoing expression parameter and the expression base according to the expression base corresponding to the driving character and the expression base corresponding to the driven character, and the driven character is driven according to the mapping relationship by using the known expression parameter of the driving character and the foregoing mapping relationship, so that the driven character makes the actual expression identified by the known expression parameter. Therefore, the new animation character may be directly driven by using the known expression parameter of another animation character without performing processing to obtain the face customization base corresponding to the new animation character, thereby increasing the speed and efficiency of launching the new animation character.

DESCRIPTION OF EMBODIMENTS

Figure 1:
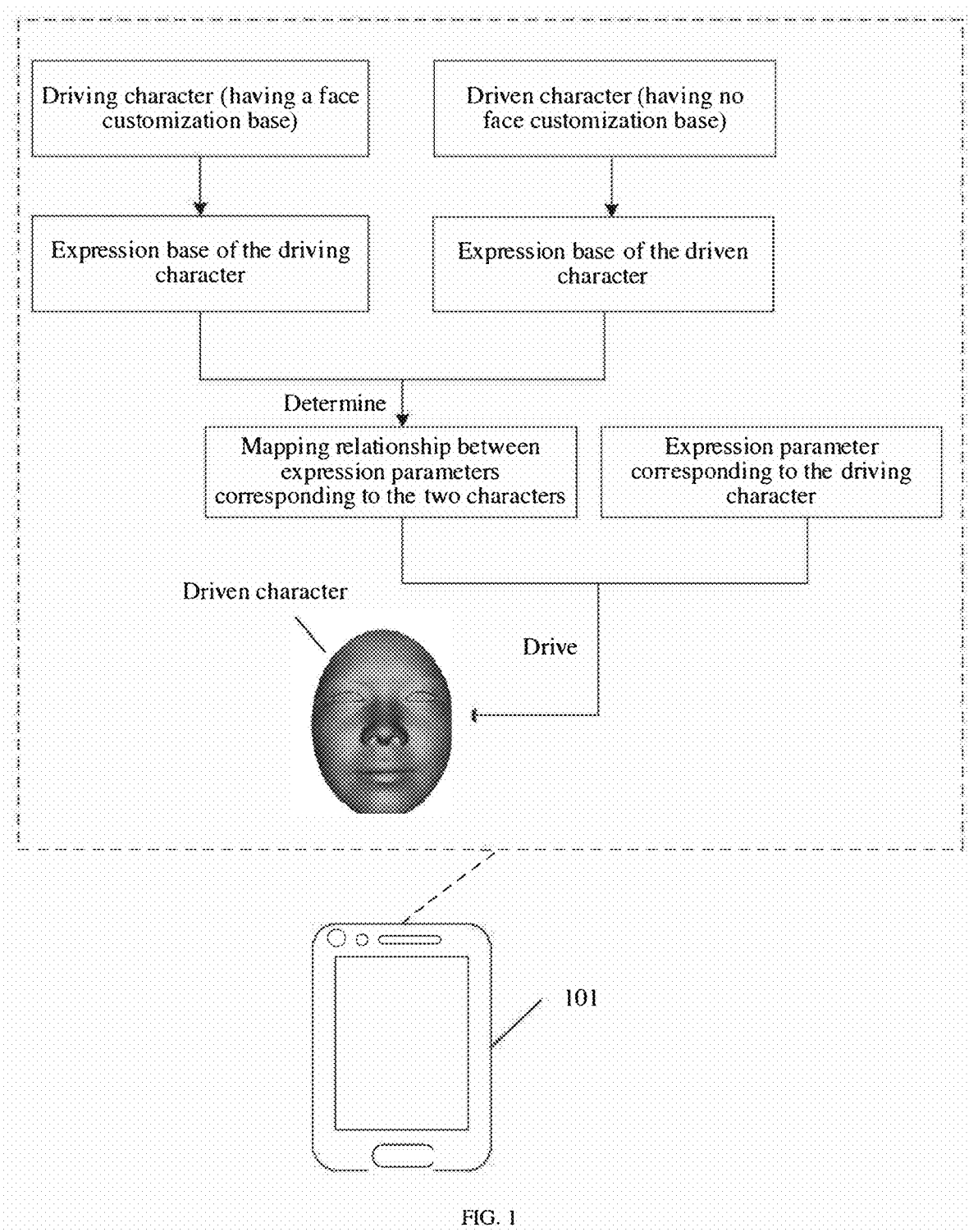
FIG. 1 is a schematic diagram of an application scenario of an artificial intelligence-based (AI-based) animation character control and drive method according to an embodiment of this application.

The following describes embodiments of this application with reference to the accompanying drawings.

In the related art, for some newly created animation characters, generally, a designer may manually design three-dimensional (3D) meshes of the animation characters. For example, the designer may obtain an expression base through manual modeling. However, a face customization base does not have clear semantic information, and has an inaccurate association with a mesh vertex of a model, and therefore it is difficult to obtain the face customization base through manual design.

In addition, because vertex topologies of 3D meshes (for example, including a quantity of vertices and a triangle topology between the vertices) and quantities of dimensions of expression bases of different animation characters may be different, it is generally difficult to directly drive, by using an expression parameter of an animation character having a face customization base under a specific expression base, an expression base of another animation character. Therefore, to drive the expression base of the another animation character and launch a new animation character, a corresponding face customization base may be determined through only complex data processing, thereby delaying the launch of the new animation character.

For this end, an embodiment of this application provides an artificial intelligence-based (AI-based) animation character drive method. The method can implement expression parameter migration between expression bases of different animation characters. That is, when one animation character has a corresponding face customization base, and one animation character has no corresponding face customization base, the animation character having the face customization base is used as a driving character, and the animation character that has no face customization base is used as a driven character. A mapping relationship between an expression parameter corresponding to the driving character and an expression parameter corresponding to the driven character is determined, so as to drive the driven character by using a known expression parameter of the driving character and the foregoing mapping relationship without performing processing to obtain a face customization base corresponding to the driven character.

The AI-based animation character control and drive method provided in the embodiments of this application is applicable to a processing device with a capability of establishing an animation character. The processing device may be a terminal device, or may be a server.

The processing device may have a capability of implementing a computer vision technology. In this embodiment of this application, by implementing the foregoing computer vision technology, the processing device may determine a mapping relationship between expression parameters according to an expression base corresponding to a driving character and an expression base corresponding to a driven character, so as to drive the driven character according to the mapping relationship by using the known expression parameter of the driving character and the foregoing mapping relationship, thereby implementing a function such as quickly launching a new animation character.

If the processing device is a terminal device, the terminal device may be a smart terminal, a computer, a personal digital assistant (PDA), a tablet computer, or the like.

If the processing device is a server, the server may be an independent server, or may be a cluster server. When the server implements the AI-based animation character control and drive method, the server may determine a mapping relationship between expression parameters according to an expression base corresponding to a driving character and an expression base corresponding to a driven character, control and drive the driven character by using the known expression parameter of the driving character and the foregoing mapping relationship, to obtain a new animation character, and display and launch the new animation character on a terminal device.

In this embodiment of this application, the animation characters may include a two-dimensional (2D) animation character and a 3D animation character; the animation character may specifically present only a face region or a head region, or may present a whole-body region; in addition, the animation character may be specifically expressed as a cartoon character, or may be expressed as a virtual character constructed based on a real human or animal. An expression form of the animation character is not limited in this application. The AI-based animation character control and drive method provided in the embodiments of this application is applicable to application scenarios in which manually designed animation characters need to be driven, such as a news broadcast, a weather forecast, a game commentary, and a game scene in which a virtual game character exists, and is also applicable to application scenarios in which animation characters need to be used for undertaking personal services, for example, a one-to-one service directed to individuals such as a psychologist or a virtual assistant. In the application scenarios, by using the method provided in the embodiments of this application, the animation character may be driven without performing processing to obtain the face customization base corresponding to the animation character.

For ease of understanding of the technical solutions of this application, the AI-based animation character control and drive method provided in the embodiments of this application is described below with reference to an actual application scenario.

FIG. 1 is a schematic diagram of an application scenario of an AI-based animation character control and drive method according to an embodiment of this application. This application scenario is described by using an example in which a processing device is a terminal device. The application scenario includes a terminal device 101. The terminal device 101 may obtain an expression base corresponding to a driving character and an expression base corresponding to a driven character. The driving character is an animation character having the expression base and a face customization base, and the driven character is an animation character that has the expression base but has no face customization base.

The expression base is used for identifying an expression feature of a face of an animation character, and is formed by deformable meshes representing different expressions, and each deformable mesh is formed by changing a 3D model of the animation character under different expressions. The face customization base is used for identifying a basic feature of a face of an animation character, and is formed by deformable meshes representing different face shapes, each deformable mesh is a face that changes greatly relative to an average face shape, and faces in the face customization base need to be related to the animation character.

There is a mapping relationship between an expression parameter corresponding to the driving character and an expression parameter corresponding to the driven character. Therefore, if the mapping relationship is determined, the driven character may be directly driven by using the expression parameter corresponding to the driving character even if the driven character has no face customization base. An expression form of the expression parameter may be a coefficient, for example, may be a vector with a specific quantity of dimensions; and the mapping relationship may be a linear mapping relationship, or may be a non-linear mapping relationship. This is not limited in this embodiment.

The driven character may be driven, according to an actual expression parameter corresponding to the driving character, to make an actual expression, the actual expression parameter may reflect a degree of correlation between the actual expression and an expression base under different dimensions, and similarly, an actual expression parameter corresponding to the driven character may also reflect a degree of correlation between an actual expression of the driven character and an expression base under different dimensions. Therefore, the terminal device 101 may determine a mapping relationship between an expression parameter corresponding to the driving character and an expression parameter corresponding to the driven character based on an association relationship between the foregoing expression parameter and the expression base according to the expression base corresponding to the driving character and the expression base corresponding to the driven character.

Because the terminal device 101 may calculate the expression parameter corresponding to the driven character according to the mapping relationship and the expression parameter corresponding to the driving character, and the calculated expression parameter of the driven character is the same as a quantity of dimensions of the expression base of the driven character, the terminal device may drive, by using the calculated expression parameter of the driven character, the driven character to make an expression. Therefore, the terminal device 101 may directly drive the driven character according to the expression parameter corresponding to the driving character and the mapping relationship.

It is to be understood that the application scenario shown in FIG. 1 is merely an example. In actual application, the AI-based animation character control and drive method provided in the embodiments of this application is further applicable to another application scenario, and the application scenario to which the AI-based animation character control and drive method provided in the embodiments of this application is applicable is not limited herein.

Figure 2:
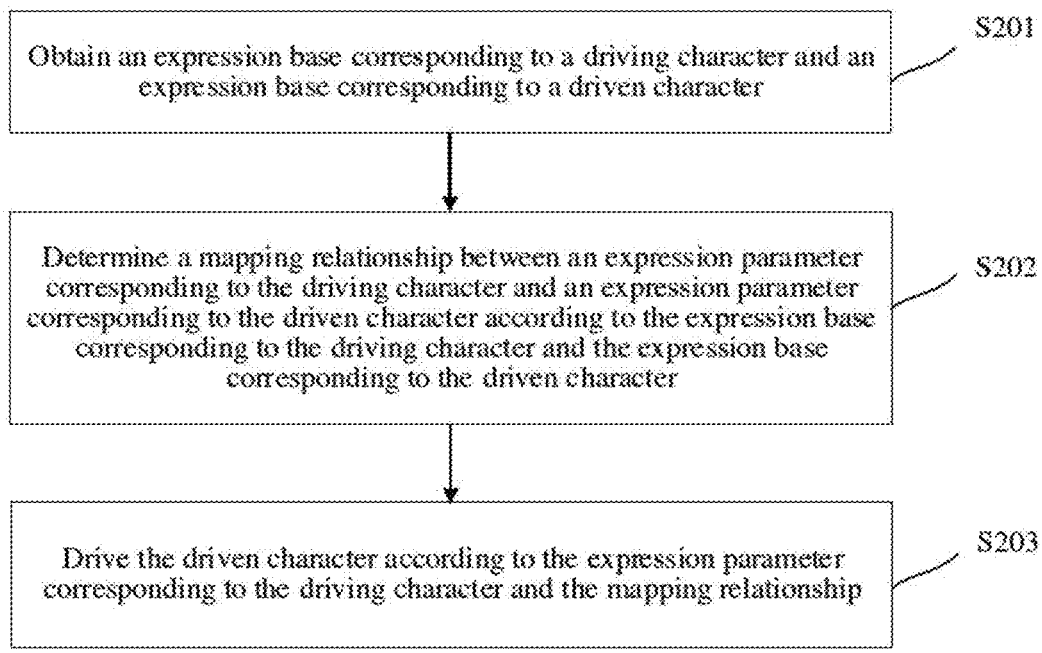
FIG. 2 is a flowchart of an AI-based animation character control and drive method according to an embodiment of this application.

Next, the AI-based animation character control and drive method provided in the embodiments of this application is described in detail with reference to the accompanying drawings. Referring to FIG. 2, the method includes the following steps:

S201. Obtain an expression base corresponding to a driving character and an expression base corresponding to a driven character.

In some animation characters, a part of the animation characters are animation characters that have been launched and have expression bases and face customization bases, while a part of the animation characters are new animation characters that have only expression bases but do not have face customization bases. In this embodiment, the driving character is an animation character having the corresponding face customization base, and the driven character is an animation character that has no corresponding face customization base.

The animation character in this embodiment of this application may be a model in a model library, or may be obtained through a linear combination of models in a model library. The model library may be a face 3D morphable model (3DMM) library, or another model library, which is not limited in this embodiment. The animation character such as the driving character or the driven character may be a 3D mesh.

The 3DMM library is used as an example. The 3DMM library is obtained from a large amount of high-precision face data by using a principal component analysis (PCA) method, and describes a main change of a high-dimensional face shape and an expression relative to an average face, or may describe texture information.

Generally, when the 3DMM library describes an expressionless face shape, the 3DMM library may be obtained through mu+Σ(Pface$_i$−mu)*α$_i$, where mu is an average face with a neutral expression, Pface$_i$ is a principal component of an $i^{th}$ face shape, and α$_i$ is a weight of the principal component of the $i^{th}$ face shape, that is, a face customization parameter.

Figure 3:
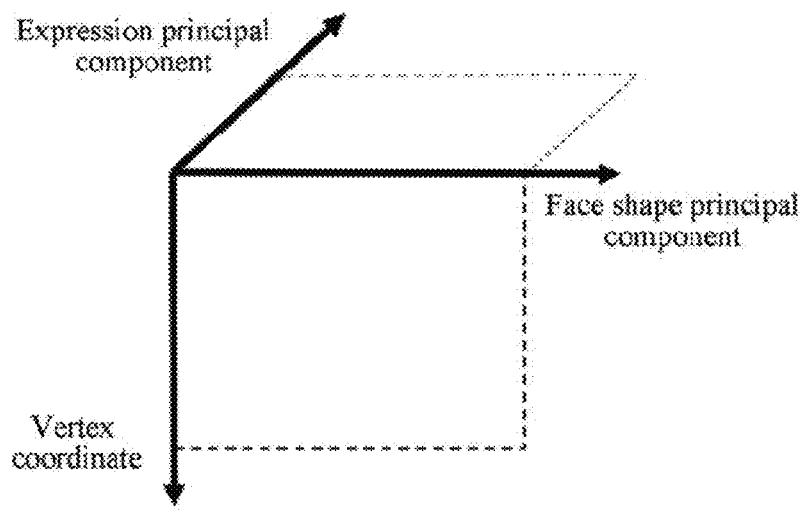
FIG. 3 is an exemplary diagram of distribution and meaning of each dimension of M in a 3DMM library according to an embodiment of this application.

Assuming that a mesh corresponding to an animation character in the 3DMM library may be represented by M, that is, a relationship among the face shape, the expression, and a vertex in the 3DMM library is represented by M, and M is a [m×n×d] 3D matrix, where the dimensions are a vertex coordinate (m), a face shape principal component (n), and an expression principal component (d) of a mesh. The distribution and meaning of each dimension of M in the 3DMM library are shown in FIG. 3. Because m represents values of three coordinates xyz, a quantity of vertices of the mesh is m/3, which is denoted by v. If the face shape or the expression of the animation character is determined, M may be a 2D matrix.

In this embodiment of this application, regardless of the texture dimension in the 3DMM library, assuming that the driving of the animation character is F, F may be determined by using a formula (1):

$$F = M \times \alpha \times \beta = \sum_{i=1}^{d}(\sum_{j=1}^{n} M_{k,j,i} * a_j) * \beta_i \qquad (1),$$

where M is a mesh of the animation character, α is a face customization parameter, and β is an expression parameter; and d is a quantity of expression meshes in an expression base, n is a quantity of face customization meshes in a face customization base, $M_{k,j,i}$ is a $k^{th}$ mesh including an $i^{th}$ expression mesh and a $j^{th}$ face customization mesh, $\alpha_j$ is a weight representing a $j^{th}$ face shape principal component in a $j^{th}$ dimension in a set of face customization parameters, and $\beta_i$ is a weight representing an $i^{th}$ expression principal component in an $i^{th}$ dimension in a set of expression parameters.

A process of determining the face customization parameter is a face customization algorithm, and a process of determining the expression parameter is an expression customization algorithm. The face customization parameter is used for linearly combining with the face customization base to obtain a corresponding face shape. For example, there is a face customization base including 50 face customization meshes (pertaining to deformable meshes, for example, blendshapes), a face customization parameter corresponding to the face customization base is a vector having 50 dimensions, and each dimension may identify a degree of correlation between a face shape corresponding to the face customization parameter and one face customization mesh. The face customization meshes included in the face customization base each represent a different face shape, each face customization mesh is a facial appearance that changes greatly relative to the average face, and is a face shape principal component in different dimensions obtained by PCA decomposing a large quantity of faces, and vertex sequence numbers corresponding to different face customization meshes in the same face customization base are kept consistent.

The expression parameter is used for linearly combining with the expression base to obtain a corresponding expression. For example, there is an expression base including 50 (equivalent to a quantity of dimensions of 50) expression meshes (pertaining to deformable meshes, for example, blendshapes), an expression parameter corresponding to the expression base is a vector having 50 dimensions, and each dimension may identify a degree of correlation between an expression corresponding to the expression parameter and one expression mesh. The expression meshes included in the expression base each represent a different expression, each expression mesh is formed by changing the same 3D model under different expressions, and vertex sequence numbers corresponding to different expression meshes in the same expression base are kept consistent.

For the foregoing deformable meshes, a single mesh may be deformed according to a predefined shape, to obtain any quantity of meshes.

S202. Determine a mapping relationship between an expression parameter corresponding to the driving character and an expression parameter corresponding to the driven character according to the expression base corresponding to the driving character and the expression base corresponding to the driven character.

Based on the method in this embodiment, in a scenario where the driven character is driven according to the mapping relationship between the expression parameters by using the expression parameter of the driving character, a face customization base remains unchanged. That is, a face shape is fixed, and only the expression base needs to be adjusted.

Therefore, the driving of the animation character based on the foregoing formula (1) may be further expressed as a formula (2):

$$M_k = \sum_{i=1}^{n} M_{k,i} * \beta_i \quad (2),$$

where $M_k$ is driving of an animation character with a fixed face shape, $M_{k,i}$ is an $i^{th}$ expression mesh, $\beta_i$ is an expression parameter corresponding to the $i^{th}$ expression mesh, and n is a quantity of expression meshes in an expression base.

If an animation character a has an expression base and a face customization base, an animation character b has an expression base but has no face customization base, and the animation character a has obtained some expression parameters by using the expression customization algorithm, the animation character a may be used as the driving character, and the animation character b may be used as the driven character. Through the linear combination of the expression parameter and the expression base, driving of the animation character a may be obtained based on a formula (3):

$$M_k^a = \sum_{i=1}^{n^a} M_{k,i}^a \beta_i^a \quad (3),$$

where $M_k^a$ is the driving of the animation character a, $M_{k,i}^a$ is an $i^{th}$ expression mesh of the animation character a, $\beta_i^a$ is an expression parameter corresponding to the $i^{th}$ expression mesh of the animation character a, and $n^a$ is a quantity of expression meshes included in the expression base of the animation character a.

Similarly, driving of the animation character b is obtained based on a formula (4):

$$M_k^b = \sum_{i=1}^{n^b} M_{k,i}^b * \beta_i^b \quad (4),$$

where $M_k^b$ is the driving of the animation character b, $M_{k,i}^b$ is an $i^{th}$ expression mesh of the animation character b, $\beta_i^b$ is an expression parameter corresponding to the $i^{th}$ expression mesh of the animation character b, and $n^b$ is a quantity of expression meshes in the expression base of the animation character b.

There is a mapping relationship between the expression parameter corresponding to the driving character and the expression parameter corresponding to the driven character, and therefore the mapping relationship between the expression parameter corresponding to the driving character and the expression parameter corresponding to the driven character may be represented by using a function f( ). In this way, a formula (5) for calculating the expression parameter corresponding to the driven character according to the expression parameter corresponding to the driving character is as follows:

$$\beta^b = f(\beta^a) \quad (5),$$

where $\beta^b$ is the expression parameter corresponding to the driven character, $\beta^a$ is the expression parameter corresponding to the driving character, and f( ) represents the mapping relationship between the expression parameter corresponding to the driving character and the expression parameter corresponding to the driven character.

Therefore, if the mapping relationship is determined, the driven character (the animation character b) may be directly driven with reference to the formula (4) and the formula (5) by using the expression parameter corresponding to the driving character (the animation character a).

The driven character may be driven, according to an actual expression parameter corresponding to the driving character, to make an actual expression, and the actual expression parameter may reflect a degree of correlation between the actual expression and an expression base under different dimensions, that is, an actual expression parameter corresponding to the driven character may also reflect a degree of correlation between an actual expression of the driven character and an expression base under different dimensions. Therefore, a mapping relationship between expression parameters may be determined based on an association relationship between the foregoing expression parameter and the expression base according to the expression base corresponding to the driving character and the expression base corresponding to the driven character.

S203. Drive the driven character according to the expression parameter corresponding to the driving character and the mapping relationship.

The foregoing animation character a and animation character b are still used as an example. If the mapping relationship is a linear relationship, the foregoing formula (5) may be expressed as a formula (6):

$$\beta^b = f * \beta^a \quad (6),$$

where $\beta^b$ is the expression parameter corresponding to the driven character, $\beta^a$ is the expression parameter corresponding to the driving character, and f represents the mapping relationship between the expression parameter corresponding to the driving character and the expression parameter corresponding to the driven character.

After the mapping relationship f between the expression parameter corresponding to the driving character and the expression parameter corresponding to the driven character is determined, an expression parameter $\beta^b$ of the animation character b may be calculated with reference to the formula (6). A quantity of dimensions of $\beta^a$ is different from a quantity of dimensions of the expression base of the animation character b, but a quantity of dimensions of $\beta^b$ obtained through the mapping relationship is the same as the quantity of dimensions of the expression base of the animation character b, so that the animation character b may be driven to make an expression. Therefore, the animation character b is driven based on the formula (6) by using $\beta^b$. That is, the animation character b may be directly driven by using the expression parameter $\beta^a$ corresponding to the animation character a without determining a face customization base of the animation character b.

The animation character control and drive method provided in the embodiments of this application is not limited to being applicable to migration between expression bases (for faces) corresponding to different animation characters. That is, the driven character is directly driven, by using the expression parameter corresponding to the driving character, to make an expression, for example, a mouth shape, a smile, or a cry. The animation character drive method provided in the embodiments of this application is further applicable to migrating other objects such as a body action. That is, the driven character is directly driven, by using an action parameter corresponding to the driving character, to make an action.

It can be learned from the foregoing technical solutions that, when one animation character has a corresponding face customization base, and one animation character has no corresponding face customization base, the animation character having the face customization base may be used as a driving character, and the animation character that has no face customization base may be used as a driven character. There is a mapping relationship between an expression parameter corresponding to the driving character and an expression parameter corresponding to the driven character. Therefore, after the mapping relationship is determined, the driven character may be directly driven based on the mapping relationship by using the expression parameter corresponding to the driving character even if the driven character has no face customization base. The driven character may be driven, according to an actual expression parameter corresponding to the driving character, to make an actual expression, and the actual expression parameter may reflect a degree of correlation between the actual expression and an expression base under different dimensions, that is, an actual expression parameter corresponding to the driven character may also reflect a degree of correlation between an actual expression of the driven character and an expression base under different dimensions. Therefore, a mapping relationship between the expression parameters may be determined based on an association relationship between the foregoing expression parameter and the expression base according to the expression base corresponding to the driving character and the expression base corresponding to the driven character, and the driven character is driven according to the mapping relationship by using the known expression parameter of the driving character and the mapping relationship, so that the driven character makes the actual expression identified by the known expression parameter. Therefore, the new animation character may be directly driven by using a known expression parameter of another animation character without performing processing to obtain a face customization base corresponding to the new animation character, thereby increasing the speed of launching the new animation character.

Next, how to determine the mapping relationship between the expression parameter corresponding to the driving character and the expression parameter corresponding to the driven character is described in detail for S202. The mapping relationship being the linear mapping relationship is mainly described in the following embodiments.

Two types of methods for determining the mapping relationship are mainly provided in this embodiment. An idea of a first type of method is to determine, according to a known expression parameter such as a first expression parameter, another expression parameter such as a second expression parameter. Because there is a mapping relationship between the first expression parameter and the second expression parameter, the mapping relationship is solved according to the first expression parameter and the second expression parameter. An idea of a second type of method is to determine a mapping relationship based on an analytical expression. Because completely identical point cloud data may be obtained through conversion between the expression base of the driving character and the expression base of the driven character, the mapping relationship is solved based on an equation relationship between the point cloud data.

Figure 4:
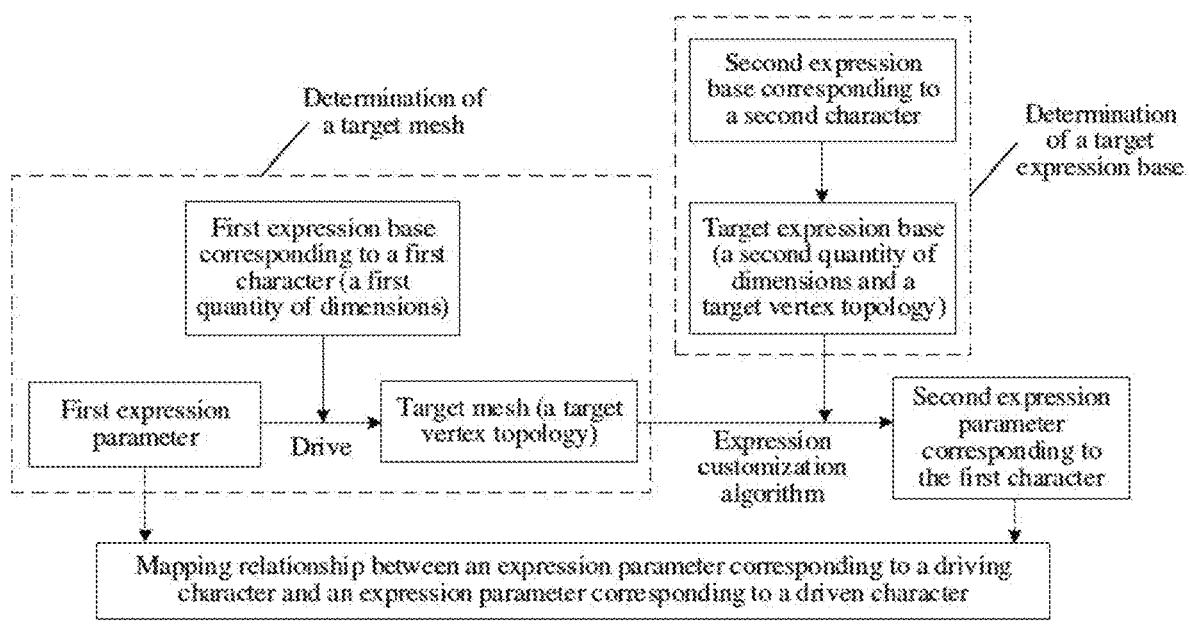
FIG. 4 is a flowchart of an AI-based animation character control and drive method according to an embodiment of this application.

For a flowchart of the first type of method, reference may be made to FIG. 4. The first expression parameter is an expression parameter used for driving a quantity of dimensions of an expression base to be a first quantity of dimensions, and a quantity of dimensions of the first expression base is the first quantity of dimensions. An expression base corresponding to a first character is driven by using the first expression parameter, so as to determine a target mesh according to the first expression parameter and the first expression base corresponding to the first character. The target mesh has a target vertex topology used for identifying the first character that makes an expression corresponding to the first expression parameter. A target expression base corresponding to the first character having the target vertex topology is obtained, a quantity of dimensions of the target expression base is a second quantity of dimensions, and the target expression base is determined according to a second expression base corresponding to a second character. Then, a second expression parameter corresponding to the first character is determined according to the target mesh and the target expression base, the second expression parameter being used for reflecting a change degree of the expression of the first character relative to the target mesh. The mapping relationship between the expression parameter corresponding to the driving character and the expression parameter corresponding to the driven character is determined according to the first expression parameter and the second expression parameter. A process of determining the target mesh is annotated in a left dotted box, and a process of determining the target expression base is annotated in a right dotted box.

One of the first character and the second character has a corresponding face customization base, the other has no corresponding face customization base, the driving character is a character that has the corresponding face customization base in the first character and the second character, and the driven character is a character that has no corresponding face customization base in the first character and the second character.

A plurality of different manners of determining the target mesh may be provided in this embodiment of this application based on the embodiment corresponding to FIG. 4. It may be understood that, if the target vertex topology is a second vertex topology corresponding to the second expression base, because the first expression base corresponds to a first vertex topology, generally, a mesh obtained by driving the first expression base by using the first expression parameter has the first vertex topology. When the first vertex topology is different from the second vertex topology, to obtain a target mesh having the second vertex topology, the mesh having the first vertex topology needs to be converted into the target mesh having the second vertex topology.

The vertex topologies such as the first vertex topology, the second vertex topology, and the target vertex topology mentioned in this embodiment of this application may be a part of vertex topologies in meshes, and the part of vertex topologies are the vertex topologies involved in the driving of the animation character. For example, an animation object is a head. When an animation character is driven to make a facial expression, vertex topologies involved are vertex topologies corresponding to a face in meshes representing the head.

Figure 5:
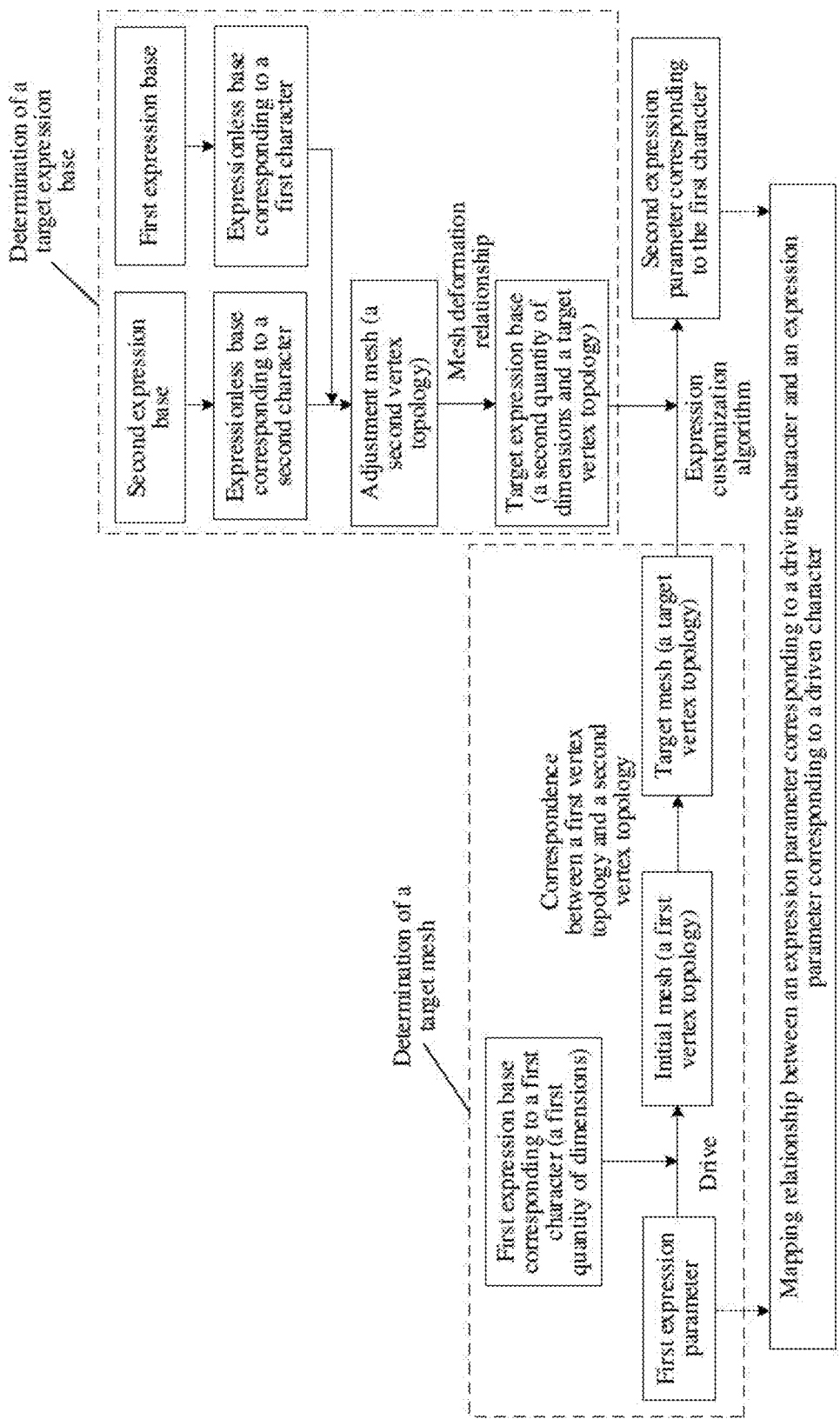
FIG. 5 is a flowchart of an AI-based animation character control and drive method according to an embodiment of this application.

Therefore, in a possible implementation, referring to FIG. 5, a manner of determining the target mesh may include: determining an initial mesh according to the first expression parameter and the first expression base corresponding to the first character. Because the initial mesh has the first vertex topology corresponding to the first expression base, the target mesh may be generated according to a correspondence between the first vertex topology and the second vertex topology.

In this case, a manner of determining the target expression base may include: determining an expressionless mesh corresponding to the first character with no expression from the first expression base, and determining an expressionless mesh corresponding to the second character with no expression from the second expression base; and then determining an adjustment mesh according to the expressionless mesh corresponding to the first character and the expressionless mesh corresponding to the second character, the adjustment mesh having the second vertex topology used for identifying the first character being expressionless. Because the adjustment mesh and a mesh deformation relationship in the second expression base have been known, the target expression base may be generated according to the adjustment mesh and the mesh deformation relationship in the second expression base. The mesh deformation relationship may reflect a deformation relationship of the expression mesh relative to the expressionless mesh in the expression base.

The vertex topology has a certain relationship with the animation character, but the relationship between the vertex topology and the animation character is not strong. That is, if the animation characters are the same, the vertex topologies are surely the same, but if the vertex topologies are the same, the animation characters may be different (for example, the vertex topologies are deformed). A specific manner of determining the adjustment mesh may include: attaching the expressionless mesh corresponding to the second character to the expressionless mesh corresponding to the first character by using a face customization algorithm. For example, a nricp algorithm may be used as the face customization algorithm, to obtain a new mesh, that is, the adjustment mesh. Certainly, other face customization algorithms may be further used in addition to the nricp algorithm. This is not limited in this embodiment.

When the first vertex topology is the same as the second vertex topology, the mesh obtained by driving the first expression base by using the first expression parameter is the target mesh but not the initial mesh, and the foregoing step of converting the initial mesh into the target mesh is not needed.

When the second expression parameter corresponding to the first character and a large quantity of existing expression parameters corresponding to the first character have the same data distribution, the target mesh and the target expression base can be more accurately determined by using the method provided in the embodiment corresponding to FIG. 5, and the mapping relationship is further accurately determined, so that the driven character may be better driven according to the mapping relationship and the expression parameter of the driving character.

However, in some cases, the second expression parameter corresponding to the first character determined through the embodiment corresponding to FIG. 5 and the large quantity of existing expression parameters corresponding to the first character may not have the same data distribution. To avoid a problem that the mapping relationship cannot be accurately determined due to a data distribution difference between the second expression parameter corresponding to the first character and the large quantity of existing expression parameters corresponding to the first character, and a correct expression cannot be further mapped due to an improper expression caused when the driven character is driven by using the expression parameter corresponding to the driving character, and other problems, another manner of determining the target mesh is further provided in this embodiment of this application.

Figure 6:
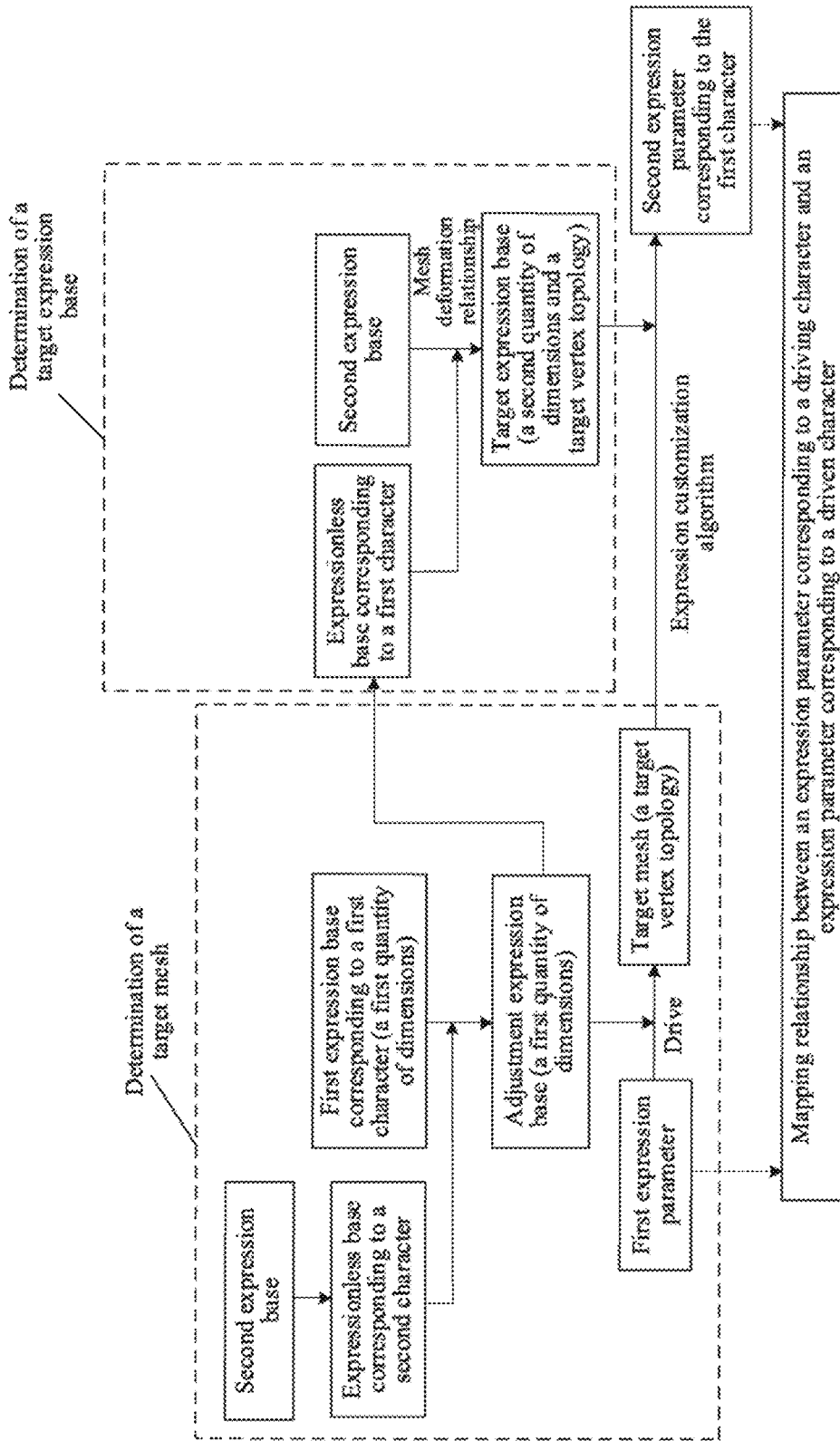
FIG. 6 is a flowchart of an AI-based animation character control and drive method according to an embodiment of this application.

Referring to FIG. 6, this manner includes: determining an expressionless mesh corresponding to the second character with no expression from the second expression base corresponding to the second character; determining, according to the expressionless mesh corresponding to the second character and the first expression base corresponding to the first character, an adjustment expression base corresponding to the first character having the second vertex topology, a quantity of dimensions of the adjustment expression base being the first quantity of dimensions; and driving the adjustment expression base by using the first expression parameter, to determine the target mesh according to the first expression parameter and the adjustment expression base. In this case, the manner of determining the target expression base may include: determining an expressionless mesh corresponding to the first character with no expression from the adjustment expression base; and generating the target expression base according to the expressionless mesh corresponding to the first character and a mesh deformation relationship in the second expression base.

A manner of determining the adjustment expression base may include: attaching the expressionless mesh corresponding to the second character to each expression mesh in the first expression base by using the face customization algorithm, to obtain a new expression base, for example, the adjustment expression base. This is a non-rigid registration method, and the face customization algorithm may be, for example, the nricp algorithm.

By using the method provided in the embodiment corresponding to FIG. 6, the problem that the mapping relationship cannot be accurately determined due to different data distributions is avoided, so that the mapping quality is significantly improved.

Figure 7:
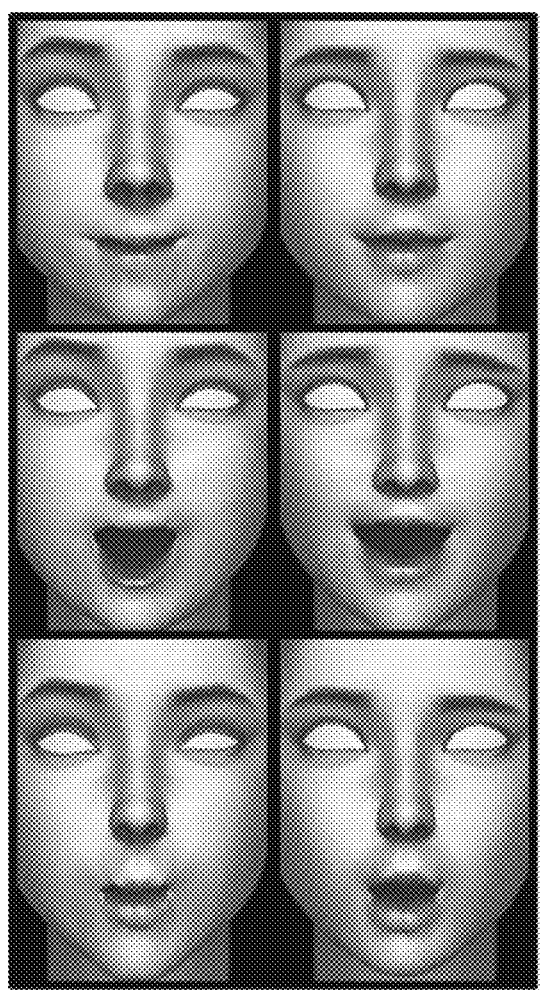
FIG. 7 is a diagram of an effect of driving an animation character according to an embodiment of this application.

FIG. 7 is a diagram of an effect of driving an animation character based on the method provided in the embodiments corresponding to FIG. 5 and FIG. 6. The left side is a diagram of an effect of driving the animation character based on the method provided in the embodiment corresponding to FIG. 5, and the right side is a diagram of an effect of driving the animation character based on the method provided in the embodiment corresponding to FIG. 6. It can be learned that, in the diagram of the effect in the right side, there are fewer wrinkles around lips more like a mouth shape of normal speaking.

The manners of determining the target mesh in FIG. 5 and FIG. 6 may be interchanged with each other. Similarly, the manners of determining the target expression base in FIG. 5 and FIG. 6 may also be interchanged with each other.

In a case of using the first type of method, the manner of determining the mapping relationship between the expression parameter corresponding to the driving character and the expression parameter corresponding to the driven character according to the first expression parameter and the second expression parameter may include: obtaining a plurality of first expression parameters and a plurality of second expression parameters in pairs; and then determining the mapping relationship according to a first matrix formed by the plurality of first expression parameters and a second matrix formed by the plurality of second expression parameters.

It may be understood that, in any embodiment corresponding to FIG. 5 and FIG. 6, one of the first character and the second character has a corresponding face customization base, and the other has no corresponding face customization base. If the first character has no corresponding face customization base, the second character has the corresponding face customization base, and the first expression parameter is a random expression parameter. Alternatively, if the first character has the corresponding face customization base, the second character has no corresponding face customization base. Based on the embodiments corresponding to FIG. 5 and FIG. 6, for a difference between a case that the first character has the face customization base and a case that the second character has the face customization base, the animation character drive method is described.

In the embodiment corresponding to FIG. 5, if the first character has no corresponding face customization base, the second character has the corresponding face customization base, and the first expression parameter is the random expression parameter, the driving character is the second character, and the driven character is the first character. The driving character is an animation character a, the driven character is an animation character b, the first expression parameter is a random expression parameter Bb, a shape is Fb, a vertex topology is a first vertex topology Tb, and a quantity of dimensions is Nb. In other words, a first expression base Eb may be directly driven by using the random expression parameter Bb, a shape of the first expression base Eb is Fb, the vertex topology is the first vertex topology Tb, and the quantity of dimensions is a first quantity of dimensions Nb. A shape of a second expression base Ea of the animation character a is Fa, a vertex topology is a second vertex topology Ta, a quantity of dimensions is a second quantity of dimensions Na, and there have been a large quantity of expression parameters Ba used for driving the second expression base Ea. Fa is not equal to Fb, Ta is not equal to Tb, and Na is not equal to Nb.

Figure 8:
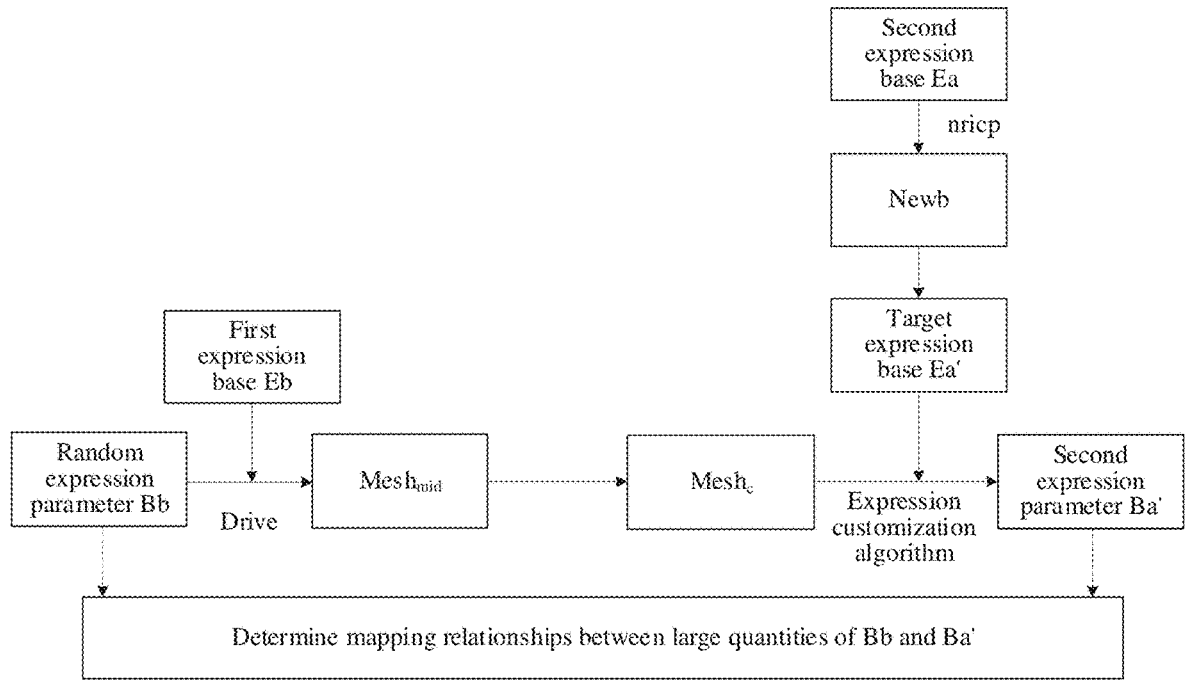
FIG. 8 is a flowchart of an AI-based animation character control and drive method according to an embodiment of this application.

In this case, for a specific implementation of the embodiment corresponding to FIG. 5, reference may be made to FIG. 8. The first expression base Eb is directly driven by using the random expression parameter Bb, to obtain an initial mesh denoted by $Mesh_{mid}$, where a shape is Fb, and a vertex topology is the first vertex topology Tb. Then, $Mesh_{mid}$ is converted into a target mesh according to a correspondence between the first vertex topology and the second vertex topology, a vertex topology is the second vertex topology (target vertex topology) Ta, a shape remains as Fb, and the target mesh is denoted by $Mesh_c$. The expressionless mesh determined from the second expression base Ea is attached, by using the nricp algorithm, to the expressionless mesh determined from the first expression base Eb, and a point correspondence relationship is obtained by using a method for searching for a closest point in space, to obtain an adjustment mesh denoted by Newb, where a shape is Fb, and a vertex topology is the second vertex topology Ta. In addition, a new expression base, for example, a target expression base Ea' needs to be obtained, a shape of the target expression base Ea' is Fb, a vertex topology is the second vertex topology Ta, and a quantity of dimensions is Na. Because the adjustment mesh Newb and a mesh deformation relationship between an expression in each dimension in the second expression base Ea relative to the neutral expression (expressionlessness) have been known, the target expression base Ea' may be obtained through deformation from Newb according to the adjustment mesh Newb and the mesh deformation relationship in the second expression base Ea. Therefore, the target mesh $Mesh_c$ may be customized by using the expression customization algorithm and by using the target expression base Ea', and a second expression parameter Ba' having a quantity of dimensions of Na is also obtained.

Therefore, a mapping relationship between Bb and Ba' is established. When a large quantity of first expression parameters Bb are randomly generated, a large quantity of corresponding second expression parameters Ba' may be generated. It is assumed that there are L first expression parameters Bb and L second expression parameters Ba', the L first expression parameters Bb form a first matrix, and the L second expression parameters Ba' form a second matrix, where the first matrix and the second matrix are respectively denoted by BB and BA', as shown in a formula (7):

$$BA'=[L\times Na], \text{ and } BB=[L\times Nb] \tag{7}$$

In this solution, if the mapping relationship between the first expression parameter and the second expression parameter meets the linear mapping relationship, for example, as shown in the formula (6), a formula for determining the mapping relationship may be a formula (8):

$$f=BB*\text{inv}(BA') \tag{8},$$

where f is the mapping relationship, BB is the first matrix, BA' is the second matrix, and inv is a matrix inversion operation.

After the mapping relationship f is obtained, because there has been a large quantity of Ba, quantities of dimensions of expression bases corresponding to both Ba and Ba' are Na, and semantic information of each quantity of dimensions is the same, Ba and Ba' may be equivalent. Therefore, for any set of Ba, corresponding Bb=f*Ba may be obtained, to obtain expression parameters Bb according to the expression parameters Ba, so as to drive the animation character b.

In the embodiment corresponding to FIG. 5, if the first character has the corresponding face customization base, and the second character has no corresponding face customization base, the driving character is the first character, and the driven character is the second character. The driving character is the animation character a, the driven character is the animation character b, the first expression parameter is the expression parameter Bb, a shape is Fa, a vertex topology is a first vertex topology Ta, and a quantity of dimensions is Na. In other words, a first expression base Ea may be directly driven by using the expression parameter Ba, a shape of the first expression base Ea is Fa, the vertex topology is the first vertex topology Ta, and the quantity of dimensions is a first quantity of dimensions Na. A shape of a second expression base Eb of the animation character b is Fb, a vertex topology is a second vertex topology Tb, a quantity of dimensions is a second quantity of dimensions Nb, and there have been a large quantity of expression parameters Ba used for driving the first expression base Ea. Fa is not equal to Fb, Ta is not equal to Tb, and Na is not equal to Nb.

Figure 9:
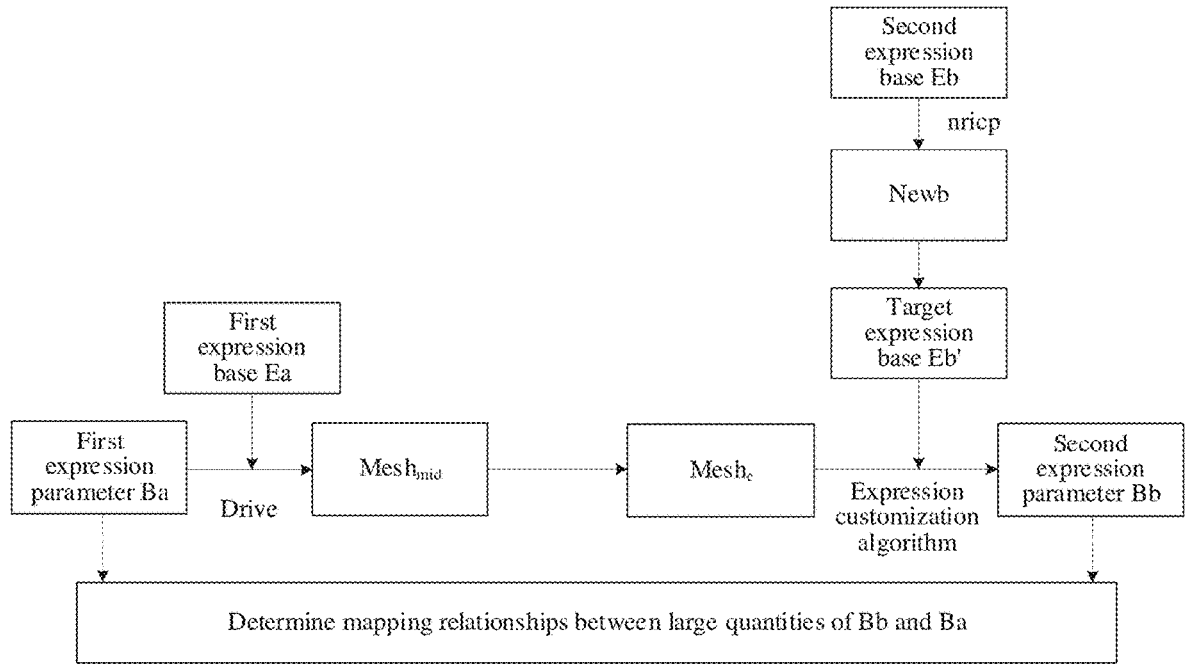
FIG. 9 is a flowchart of an AI-based animation character control and drive method according to an embodiment of this application.

In this case, for a specific implementation of the embodiment corresponding to FIG. 5, reference may be made to FIG. 9. The first expression base Ea is directly driven by using the expression parameter Ba, to obtain an initial mesh denoted by $Mesh_{mid}$, where a shape is Fa, and a vertex topology is the first vertex topology Ta. Then, $Mesh_{mid}$ is converted into a target mesh according to a correspondence between the first vertex topology and the second vertex topology, a vertex topology is the second vertex topology (target vertex topology) Tb, a shape remains as Fa, and the target mesh is denoted by $Mesh_c$. The expressionless mesh determined from the second expression base Eb is attached, by using the nricp algorithm, to the expressionless mesh determined from the first expression base Ea, and a point correspondence relationship is obtained by using a method for searching for a closest point in space, to obtain an adjustment mesh denoted by Newb, where a shape is Fa, and a vertex topology is the second vertex topology Tb. In addition, a new expression base, for example, a target expression base Eb' needs to be obtained, a shape of the target expression base Eb' is Fa, a vertex topology is the second vertex topology Tb, and a quantity of dimensions is Nb. Because the adjustment mesh Newb and a mesh deformation relationship in the second expression base Eb have been known, the target expression base Eb' may be obtained through deformation from Newb according to the adjustment mesh Newb and the mesh deformation relationship in the second expression base Eb. Therefore, the target mesh $Mesh_c$ may be customized by using the expression customization algorithm and by using the target expression base Eb', and a second expression parameter Bb having a quantity of dimensions of Nb is also obtained.

A large quantity of corresponding second expression parameters Bb may be generated by using a large quantity of existing first expression parameters Ba. Similarly, a mapping relationship between the first expression parameter and the second expression parameter may be determined by using methods in the foregoing formula (7) and formula (8).

Therefore, for any set of Ba, corresponding Bb=f*Ba may be obtained, to obtain expression parameters Bb according to the expression parameters Ba, so as to drive the animation character b.

In the embodiment corresponding to FIG. 6, if the first character has the corresponding face customization base, and the second character has no corresponding face customization base, the driving character is the first character, and the driven character is the second character. The driving character is the animation character a, the driven character is the animation character b, the first expression parameter is the expression parameter Ba, a shape is Fa, a vertex topology is the first vertex topology Ta, and a quantity of dimensions is Na. In other words, a first expression base Ea may be directly driven by using the expression parameter Ba. A shape of a second expression base Eb of the animation character b is Fb, a vertex topology is a second vertex topology Tb, a quantity of dimensions is a second quantity of dimensions Nb, and there have been a large quantity of expression parameters Ba used for driving the first expression base Ea. Fa is not equal to Fb, Ta is not equal to Tb, and Na is not equal to Nb.

Figure 10:
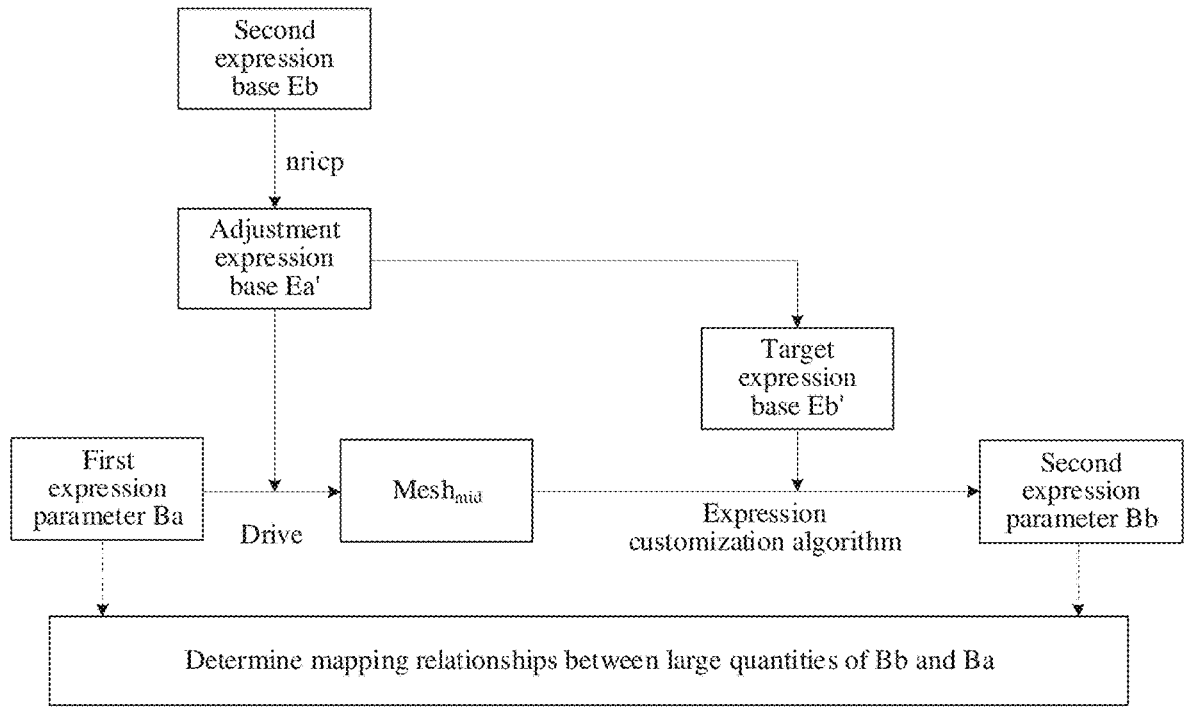
FIG. 10 is a flowchart of an AI-based animation character control and drive method according to an embodiment of this application.

In this case, for a specific implementation of the embodiment corresponding to FIG. 6, reference may be made to FIG. 10. If the target vertex topology is the second vertex topology Tb, an adjustment expression base Ea' that has a vertex topology being the second vertex topology Tb is first constructed, and it is ensured that the adjustment expression base Ea' may be driven by the first expression parameter Ba. There may be a plurality of manners of constructing the adjustment expression base Ea'. A first manner may include: attaching, by using the face customization algorithm such as the nricp algorithm, the expressionless mesh determined from the second expression base Eb to each expression mesh in the first expression base Ea, to obtain the adjustment expression base Ea'. A second manner may include: attaching, by using the face customization algorithm, the expressionless mesh determined from the second expression base Eb to the expressionless mesh in the first expression base Ea, to obtain an expressionless mesh having a vertex topology that is the same as that of the mesh in Eb and a shape that is Fa, and then changing, according to a deformation of each expression mesh in Ea relative to the expressionless mesh, the foregoing obtained expressionless mesh having the shape that is Fa and the vertex topology that is Tb, to obtain the adjustment expression base Ea', thereby ensuring that a correspondence between a pair of vertices in Ea and Eb is unique during mapping. A shape of the adjustment expression base Ea' is Fa, a vertex topology is the second vertex topology Tb, and a quantity of dimensions is the first quantity of dimensions Na.

Because the first expression base Ea may be directly driven by using the first expression parameter Ba, the adjustment expression base Ea' has the same quantity of dimensions as the first expression base Ea, and semantic information of each dimension is the same, the adjustment expression base Ea' may be directly driven by using the first expression parameter Ba, to obtain a target mesh. A shape of the target mesh is Fa, a vertex topology is the second vertex topology Tb, and the target mesh is denoted by $Mesh_c$.

To determine, according to the target mesh and the target expression base, the second expression parameter Bb that has a quantity of dimensions being the second quantity of dimensions Nb, a target expression base having a shape that is Fa, a vertex topology that is the second vertex topology Tb, and a quantity of dimensions that is Nb needs to be constructed. Therefore, an expressionless mesh corresponding to the first character with no expression is determined from the adjustment expression base Ea', a target expression base Eb' is generated according to the expressionless mesh corresponding to the first character and the mesh deformation relationship in the second expression base, a shape of the target expression base Eb' is Fa, a vertex topology is the second vertex topology Tb, and a quantity of dimensions is Nb. Therefore, the target mesh $Mesh_c$ may be customized by using the expression customization algorithm and by using the target expression base Eb', and a second expression parameter Bb having a quantity of dimensions of Nb is also obtained.

A large quantity of corresponding second expression parameters Bb may be generated by using a large quantity of existing first expression parameters Ba. Similarly, a mapping relationship between the first expression parameter and the second expression parameter may be determined by using methods in the foregoing formula (7) and formula (8).

Therefore, for any set of Ba, corresponding Bb=f*Ba may be obtained, to obtain expression parameters Bb according to the expression parameters Ba, so as to drive the animation character b.

In the embodiment corresponding to FIG. 6, if the first character has no corresponding face customization base, the second character has the corresponding face customization base, and the first expression parameter is the random expression parameter, the driving character is the second character, and the driven character is the first character. The driving character is an animation character a, the driven character is an animation character b, the first expression parameter is a random expression parameter Bb, a shape is Fb, a vertex topology is a first vertex topology Tb, and a quantity of dimensions is Nb. In other words, a first expression base Eb may be directly driven by using the random expression parameter Bb, a shape of the first expression base Eb is Fb, the vertex topology is the first vertex topology Tb, and the quantity of dimensions is a first quantity of dimensions Nb. A shape of a second expression base Ea of the animation character a is Fa, a vertex topology is a second vertex topology Ta, a quantity of dimensions is a second quantity of dimensions Na, and there have been a large quantity of expression parameters Ba used for driving the second expression base Ea. Fa is not equal to Fb, Ta is not equal to Tb, and Na is not equal to Nb.

Figure 11:
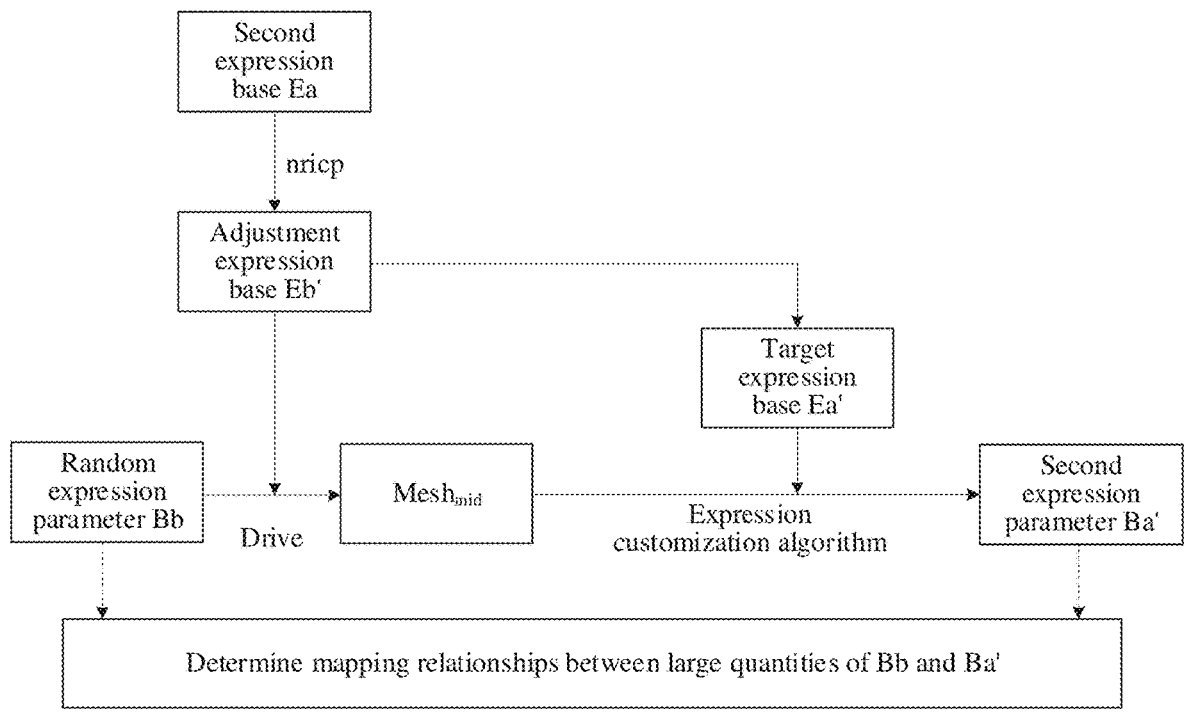
FIG. 11 is a flowchart of an AI-based animation character control and drive method according to an embodiment of this application.

In this case, for a specific implementation of the embodiment corresponding to FIG. 6, reference may be made to FIG. 11. If the target vertex topology is the second vertex topology Ta, an adjustment expression base Eb' that has a vertex topology being the second vertex topology Ta is first constructed, and it is ensured that the adjustment expression base Eb' may be driven by the first expression parameter Bb. There may be a plurality of manners of constructing the adjustment expression base Eb'. A first manner may include: attaching, by using the face customization algorithm such as the nricp algorithm, the expressionless mesh determined from the second expression base Ea to each expression mesh in the first expression base Eb, to obtain the adjustment expression base Eb'. A second manner may include: attaching, by using the face customization algorithm, the expressionless mesh determined from the second expression base Ea to the expressionless mesh in the first expression base Eb, to obtain an expressionless mesh having a vertex topology that is the same as that of the mesh in Ea and a shape that is Fb, and then changing, according to a deformation of each expression mesh in Eb relative to the expressionless mesh, the foregoing obtained expressionless mesh having the shape that is Fb and the vertex topology that is Ta, to obtain the adjustment expression base Eb', thereby ensuring that a correspondence between a pair of vertices in Ea and Eb is unique during mapping. A shape of the adjustment expression base Eb' is Fb, a vertex topology is the second vertex topology Ta, and a quantity of dimensions is the first quantity of dimensions Nb.

Because the first expression base Eb may be directly driven by using the first expression parameter Bb, the adjustment expression base Eb' has the same quantity of dimensions as the first expression base Eb, and semantic information of each dimension is the same, the adjustment expression base Eb' may be directly driven by using the first expression parameter Bb, to obtain a target mesh. A shape of the target mesh is Fb, a vertex topology is the second vertex topology Ta, and the target mesh is denoted by $Mesh_c$.

To determine, according to the target mesh and the target expression base, the second expression parameter Ba' that has a quantity of dimensions being the second quantity of dimensions Na, a target expression base having a shape that is Fb, a vertex topology that is the second vertex topology Ta, and a quantity of dimensions that is Na needs to be constructed. Therefore, an expressionless mesh corresponding to the first character with no expression is determined from the adjustment expression base Eb', a target expression base Ea' is generated according to the expressionless mesh corresponding to the first character and the mesh deformation relationship in the second expression base, a shape of the target expression base Ea' is Fb, a vertex topology is the second vertex topology Ta, and a quantity of dimensions is Na. Therefore, the target mesh $Mesh_c$ may be customized by using the expression customization algorithm and by using the target expression base Ea', and a second expression parameter Ba' having a quantity of dimensions of Na is also obtained.

When a large quantity of first expression parameters Bb are randomly generated, a large quantity of corresponding second expression parameters Ba' may be generated. Similarly, a mapping relationship between the first expression parameter and the second expression parameter may be determined by using methods in the foregoing formula (7) and formula (8).

After the mapping relationship f is obtained, because there has been a large quantity of Ba, quantities of dimensions of expression bases corresponding to both Ba and Ba' are Na, and semantic information of each quantity of dimensions is the same, Ba and Ba' may be equivalent. Therefore, for any set of Ba, corresponding Bb=f*Ba may be obtained, to obtain expression parameters Bb according to the expression parameters Ba, so as to drive the animation character b.

The first type of method described above mainly includes: determining a second expression parameter based on the existing first expression parameter obtained through sampling, and then determining a mapping relationship between the first expression parameter and the second expression parameter. To avoid a problem of an incomplete distribution of the second expression parameters caused by uneven sampling, the embodiments of this application further provide the second type of method. An implementation of the second type of method may include: determining first point cloud data corresponding to the driving character according to the expression base and the expression parameter that correspond to the driving character, and determining second point cloud data corresponding to the driven character according to the expression base and the expression parameter that correspond to the driven character. The second point cloud data may be obtained by converting the first point cloud data, or the first point cloud data may be obtained by converting the second point cloud data. If a conversion parameter of the first point cloud data and the second point cloud data is determined, a mapping relationship between the expression parameter corresponding to the driving character and the expression parameter corresponding to the driven character may be determined according to the first point cloud data, the second point cloud data, and the conversion parameter. Conversion may include, for example, rotation, translation, and scaling. The conversion parameter is used for identifying a conversion relationship in which the second point cloud data is converted into the first point cloud data.

Next, a principle of determining the point cloud data (for example, the first point cloud data and the second point cloud data) is described.

If an animation character with no expression is mu, an expression base is E, and a quantity of dimensions of the expression base E is n, B is a vector of n*1. If E is an expression base matrix, for a given n-dimensional parameter B, point cloud data R may be obtained by using a formula (9):

$$R = mu + E*B \qquad (9)$$

If the expression base of the driving character is $E_a$, the expression parameter of the driving character is $B_a$, the driving character with no expression is $mu_a$, the expression base of the driven character is $E_b$, the expression parameter of the driven character is $B_b$, and the driving character with no expression is $mu_b$, the first point cloud data is $R_a=mu_a+E_a*B_a$, and the second point cloud data is $R_b=mu_b+E_b*B_b$.

It may be understood that, in this embodiment, the conversion parameter may be determined by using a plurality of methods. For example, the conversion parameter may be calculated by using an iterative closest point (ICP) algorithm. The conversion parameter may be expressed as a formula (10):

$$trans=|sR\ sT| \quad (10),$$

where trans is the conversion parameter, s represents scaling, R represents rotation, and T represents translation.

A case that the mapping relationship between the expression parameter corresponding to the driving character and the expression parameter corresponding to the driven character is determined according to the first point cloud data, the second point cloud data, and the conversion parameter is described by using an example in which the first point cloud data is converted into the second point cloud data by using the conversion parameter.

If the first point cloud data and the second point cloud data that are processed by using the conversion parameter are completely the same, the first point cloud data and the second point cloud data that are processed by using the conversion parameter have the following relationship shown in a formula (11):

$$mu_b+E_b*B_b=trans*(mu_a+E_a*B_a) \quad (11),$$

Because trans mainly acts on the expression base, the formula (11) may be changed to a formula (12):

$$mu_b+E_b*B_b=mu_a+E_c*B_c \quad (12),$$

where Ec is a new expression base obtained by processing the expression base $E_a$ by using trans. Because trans mainly acts on the expression base, and does not affect the expression parameter, Bc=Ba. In addition, based on the formula (12), because the two expression bases have the same shape, and the characters with no expression are also the same, $mu_b=mu_a$. Therefore, the formula (12) may be further simplified into a formula (13):

$$E_b*B_b=E_c*B_a \quad (13),$$

Because an objective of the embodiment is to determine a mapping relationship f between the expression parameter Ba corresponding to the driving character and the expression parameter Bb corresponding to the driven character so that $B_b=f*B_a$, $f=E_b^{-1}*E_c$ may be obtained with reference to the formula (13).

The second type of method has a smaller mathematical error, and the obtained f is an analytical solution but not a sampling solution, thereby avoiding the problem of the incomplete distribution caused by sampling.

In addition, the calculation result f in this method depends only on the expression base. Because original point cloud data may be unevenly distributed, an effect that can be achieved by the expression base formed by uniform points inliner can be achieved by downsampling a mesh. In addition, a part used (such as only points on a mouth or an eye used) may also be controlled. In this way, the part that needs to be driven in the animation character can be accurately controlled, thereby avoiding interference caused by an unimportant part (such as a cheek).

In this embodiment, various structures of the animation character may be further driven in addition to the face of the animation character. It is to be understood that each driven structure is a deformable component of the animation character. For example, the animation character is a person. Because a hand, a foot, or the like of the person may deform (for example, bend), a driven structure may be the hand, the foot, or the like.

Figure 12A:
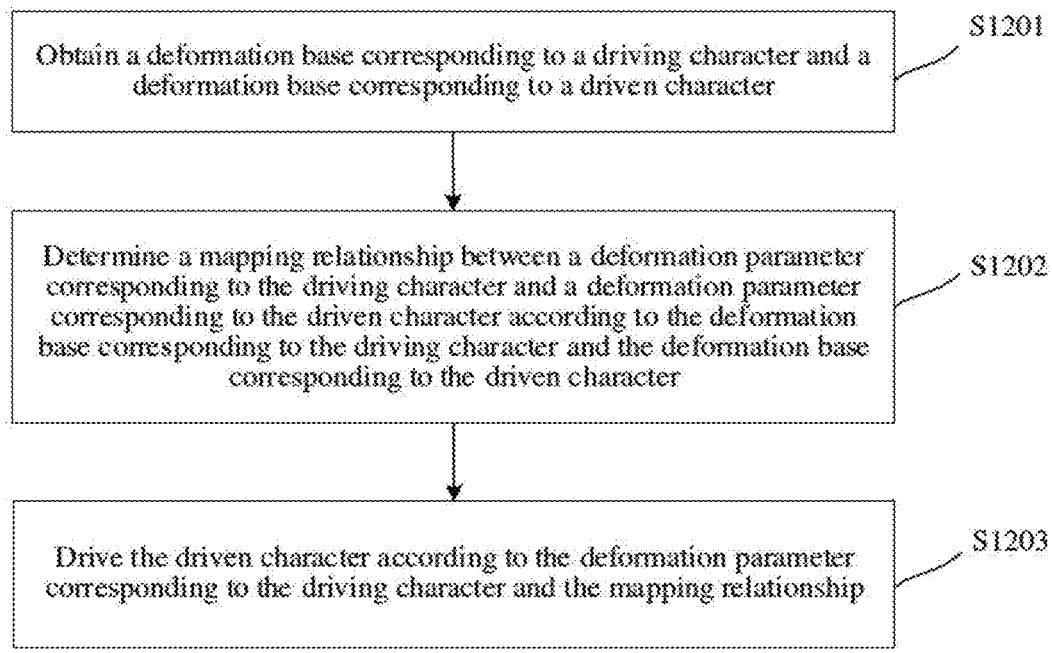
FIG. 12a is a flowchart of an AI-based animation character control and drive method according to an embodiment of this application.

Therefore, an embodiment of this application provides an animation character drive method. Referring to FIG. 12a, the method includes the following steps:

S1201. Obtain a deformation base corresponding to a driving character and a deformation base corresponding to a driven character.

The driving character has a corresponding structural base, the driven character has no corresponding structural base, the structural base is used for identifying structural features of a corresponding character, and the deformation base is used for identifying deformation features of a corresponding character. For example, the corresponding object is a hand. The structural base may reflect structural features such as a finger length, a finger thickness, a palm width and thickness, and a finger position; and the deformation base may reflect deformation features such as a finger bending degree. Certainly, if the corresponding object is a face, the structural base is the face customization base mentioned in the foregoing embodiments, and the deformation base is the expression base.

S1202. Determine a mapping relationship between a deformation parameter corresponding to the driving character and a deformation parameter corresponding to the driven character according to the deformation base corresponding to the driving character and the deformation base corresponding to the driven character.

The deformation parameter is used for identifying a change degree of a shape of the corresponding object. For example, the corresponding object is a hand, and the deformation parameter reflects a finger bending degree. Certainly, if the corresponding object is a face, the deformation parameter is the expression parameter mentioned in the foregoing embodiments.

S1203. Drive the driven character according to the deformation parameter corresponding to the driving character and the mapping relationship.

For a specific implementation of the steps in this embodiment, reference may be made to the implementation of the embodiment corresponding to FIG. 2. Details are not described herein again.

Next, the AI-based animation character control and drive method provided in the embodiments of this application is described with reference to an actual application scenario.

In this application scenario, it is assumed that the animation character is used for sending Chinese New Year's greetings. If there has been an animation character a, and the animation character a has a face customization base, a shape of an expression base Ea of the animation character a is Fa, a vertex topology is Ta, and a quantity of dimensions is Na. If it is intended to launch a new animation character b for sending Chinese New Year's greetings, a shape of an expression base Eb of the animation character b is Fb, a vertex topology is Tb, and a quantity of dimensions is Nb. Fa is not equal to Fb, Ta is not equal to Tb, and Na is not equal to Nb.

If the expression parameter Ba of the animation character a has been known, to increase the speech of launching the animation character b, the animation character a having the known expression parameter Ba may be used as the driving character, the animation character b may be used as the driven character, and a mapping relationship between the expression parameter Ba corresponding to the driving character and an expression parameter Bb corresponding to the driven character is determined according to the expression base Ea corresponding to the driving character and the expression base Eb corresponding to the driven character. In this way, when the expression parameter Ba of the driving character has been known, the expression parameter Bb corresponding to the driven character may be determined according to the known expression parameter Ba and the mapping relationship without performing processing to obtain the face customization base corresponding to the animation character b, to drive the new animation character, thereby increasing the speech of launching the animation character b.

Figure 12B:
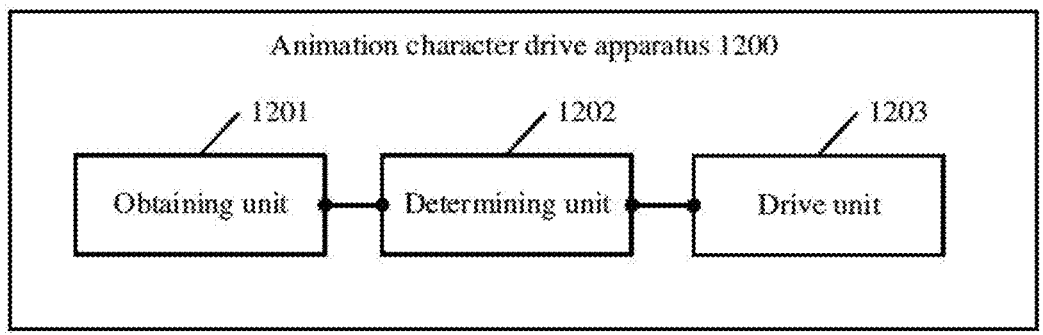
FIG. 12b is a structural diagram of an AI-based animation character control and drive apparatus according to an embodiment of this application.

Based on the method provided in the foregoing embodiments, an embodiment further provides an AI-based animation character drive apparatus. Referring to FIG. 12b, the apparatus includes an obtaining unit 1201, a determining unit 1202, and a drive unit 1203:

the obtaining unit 1201 being configured to obtain an expression base corresponding to a driving character and an expression base corresponding to a driven character, the driving character having a corresponding face customization base, the driven character having no corresponding face customization base;

the determining unit 1202 being configured to determine a mapping relationship between an expression parameter corresponding to the driving character and an expression parameter corresponding to the driven character according to the expression base corresponding to the driving character and the expression base corresponding to the driven character; and the drive unit 1203 being configured to drive the driven character according to the expression parameter corresponding to the driving character and the mapping relationship.

In a possible implementation, the driving character is a character having a corresponding face customization base in a first character and a second character, and the driven character is a character that has no corresponding face customization base in the first character and the second character. The determining unit 1202 is configured to:

determine a target mesh according to a first expression parameter and a first expression base corresponding to the first character, the first expression parameter being an expression parameter used for driving a quantity of dimensions of an expression base to be a first quantity of dimensions, a quantity of dimensions of the first expression base being the first quantity of dimensions, the target mesh having a target vertex topology used for identifying the first character that makes an expression corresponding to the first expression parameter;

obtain a target expression base corresponding to the first character having the target vertex topology, a quantity of dimensions of the target expression base being a second quantity of dimensions, the target expression base being determined according to a second expression base corresponding to the second character;

determine a second expression parameter corresponding to the first character according to the target mesh and the target expression base, the second expression parameter being used for reflecting a change degree of the expression of the first character relative to the target mesh; and determine the mapping relationship between the expression parameter corresponding to the driving character and the expression parameter corresponding to the driven character according to the first expression parameter and the second expression parameter.

In a possible implementation, the target vertex topology is a second vertex topology corresponding to the second expression base, and the determining unit 1202 is further configured to:

determine an initial mesh according to the first expression parameter and the first expression base corresponding to the first character, the initial mesh having a first vertex topology corresponding to the first expression base; and generate the target mesh according to a correspondence between the first vertex topology and the second vertex topology;

and configured to:

determine an expressionless mesh corresponding to the first character with no expression from the first expression base, and determine an expressionless mesh corresponding to the second character with no expression from the second expression base;

determine an adjustment mesh according to the expressionless mesh corresponding to the first character and the expressionless mesh corresponding to the second character, the adjustment mesh having the second vertex topology used for identifying the first character being expressionless; and generate the target expression base according to the adjustment mesh and a mesh deformation relationship in the second expression base.

In a possible implementation, the target vertex topology is a second vertex topology corresponding to the second expression base, and the determining unit 1202 is further configured to:

determine an expressionless mesh corresponding to the second character with no expression from the second expression base corresponding to the second character;

determine, according to the expressionless mesh corresponding to the second character and the first expression base corresponding to the first character, an adjustment expression base corresponding to the first character having the second vertex topology, a quantity of dimensions of the adjustment expression base being the first quantity of dimensions; and determine the target mesh according to the first expression parameter and the adjustment expression base;

and configured to:

determine an expressionless mesh corresponding to the first character with no expression from the adjustment expression base; and generate the target expression base according to the expressionless mesh corresponding to the first character and a mesh deformation relationship in the second expression base.

In a possible implementation, the first character has no corresponding face customization base, the second character has a corresponding face customization base, and the first expression parameter is a random expression parameter; or the first character has a corresponding face customization base, and the second character has no corresponding face customization base.

In a possible implementation, the determining unit 1202 is further configured to:

obtain a plurality of first expression parameters and a plurality of second expression parameters in pairs; and determine the mapping relationship according to a first matrix formed by the plurality of first expression parameters and a second matrix formed by the plurality of second expression parameters.

In a possible implementation, the determining unit 1202 is configured to:

determine first point cloud data corresponding to the driving character according to the expression base and the expression parameter corresponding to the driving character;

determine second point cloud data corresponding to the driven character according to the expression base and the expression parameter corresponding to the driven character;

determine a conversion parameter of the first point cloud data and the second point cloud data, the conversion parameter being used for identifying a conversion relationship between the second point cloud data and the first point cloud data; and determine the mapping relationship between the expression parameter corresponding to the driving character and the expression parameter corresponding to the driven character according to the first point cloud data, the second point cloud data, and the conversion parameter.

Figure 13A:
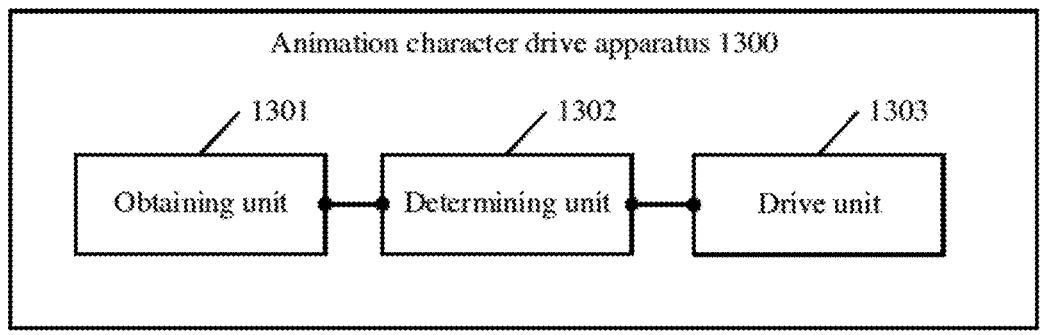
FIG. 13a is a structural diagram of an AI-based animation character control and drive apparatus according to an embodiment of this application.

An embodiment further provides an AI-based animation character control and drive apparatus. Referring to FIG. 13a, the apparatus includes an obtaining unit 1301, a determining unit 1302, and a drive unit 1303:

the obtaining unit 1301 being configured to obtain a deformation base corresponding to a driving character and a deformation base corresponding to a driven character, the driving character having a corresponding structural base, the driven character having no corresponding structural base, the structural base being used for identifying structural features of a corresponding character, the deformation base being used for identifying deformation features of a corresponding character;

the determining unit 1302 being configured to determine a mapping relationship between a deformation parameter corresponding to the driving character and a deformation parameter corresponding to the driven character according to the deformation base corresponding to the driving character and the deformation base corresponding to the driven character; and the drive unit 1303 being configured to drive the driven character according to the deformation parameter corresponding to the driving character and the mapping relationship.

Figure 13B:
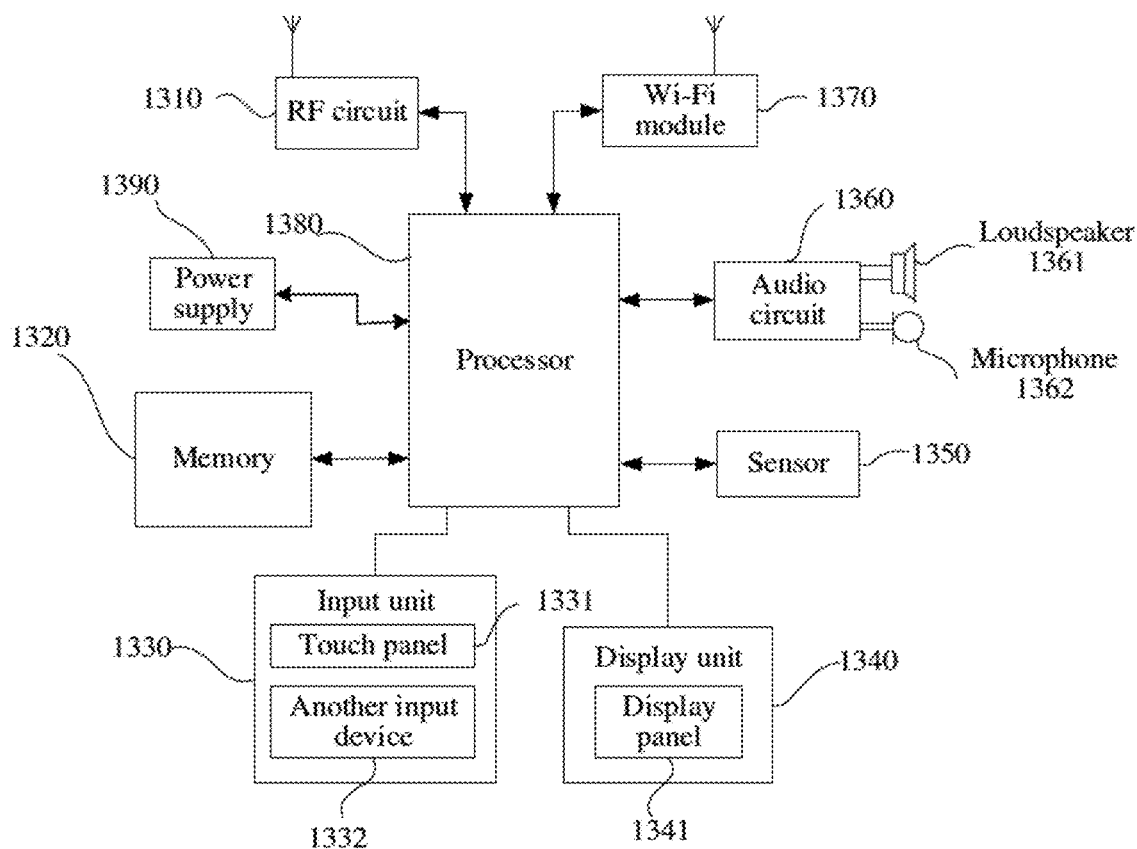
FIG. 13b is a structural diagram of a terminal device according to an embodiment of this application.

An embodiment of this application further provides a device, and the device may drive an animation character based on AI. The device is described below with reference to the accompanying drawings. Referring to FIG. 13b, an embodiment of this application provides a device 1300, and the device 1300 may alternatively be a terminal device. The terminal device may be any smart terminal including a mobile phone, a tablet computer, a PDA, a point of sales (POS), or an on-board computer, and the terminal device being a mobile phone is used as an example.

FIG. 13b is a block diagram of a structure of a part of a mobile phone related to a terminal device according to an embodiment of this application. Referring to FIG. 13b, the mobile phone includes components such as a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. Persons skilled in the art may understand that the structure of the mobile phone shown in FIG. 13b does not constitute a limitation on the mobile phone, and the mobile phone may include more or fewer components than those shown in the figure, or some components may be combined, or a different component deployment may be used.

The memory 1320 may be configured to store a software program and a module. The processor 1380 runs the software program and the module that are stored in the memory 1320, to perform various functional applications and data processing of the mobile phone. The memory 1320 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1320 may include a high-speed random access memory, and may also include a nonvolatile memory, for example, at least one magnetic disk storage device, a flash memory, or another volatile solid-state storage device.

The processor 1380 is the control center of the mobile phone, and is connected to various parts of the entire mobile phone by using various interfaces and lines. By running or executing the software program and/or the module stored in the memory 1320, and invoking data stored in the memory 1320, the processor performs various functions and data processing of the mobile phone, thereby performing overall monitoring on the mobile phone. In some implementations, the processor 1380 may include one or more processing units. Preferably, the processor 1380 may integrate an application processor and a modem. The application processor mainly processes an operating system, a user interface, an application program, and the like. The modem mainly processes wireless communication. It may be understood that the modem may either not be integrated into the processor 1380.

In this embodiment, the processor 1380 included in the terminal further has the following functions:

obtaining an expression base corresponding to a driving character and an expression base corresponding to a driven character, the driving character having a corresponding face customization base, the driven character having no corresponding face customization base;

determining a mapping relationship between an expression parameter corresponding to the driving character and an expression parameter corresponding to the driven character according to the expression base corresponding to the driving character and the expression base corresponding to the driven character; and driving the driven character according to the expression parameter corresponding to the driving character and the mapping relationship, or, obtaining a deformation base corresponding to a driving character and a deformation base corresponding to a driven character, the driving character having a corresponding structural base, the driven character having no corresponding structural base, the structural base being used for identifying structural features of a corresponding character, the deformation base being used for identifying deformation features of a corresponding character;

determining a mapping relationship between a deformation parameter corresponding to the driving character and a deformation parameter corresponding to the driven character according to the deformation base corresponding to the driving character and the deformation base corresponding to the driven character; and driving the driven character according to the deformation parameter corresponding to the driving character and the mapping relationship.

Figure 14:
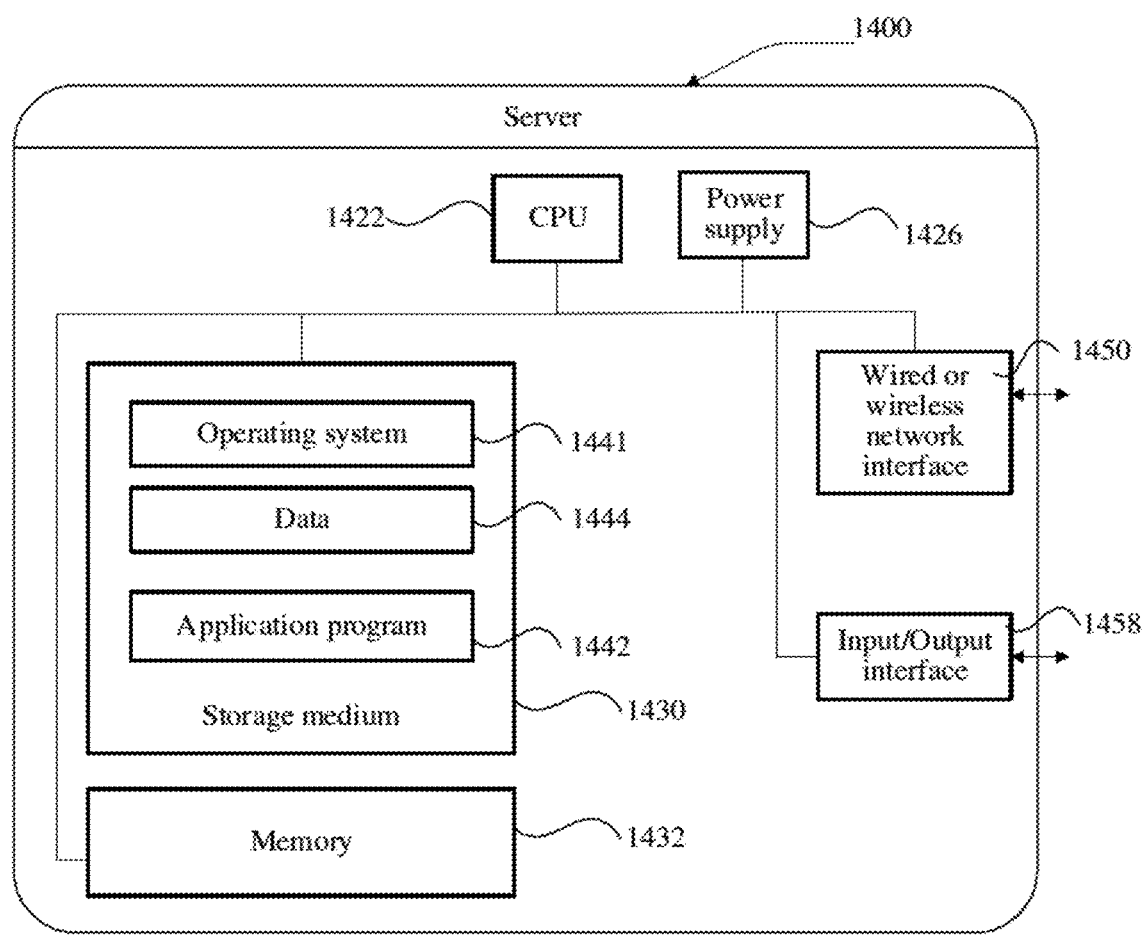
FIG. 14 is a structural diagram of a server according to an embodiment of this application.

An embodiment of this application further provides a server. FIG. 14 is a structural diagram of a server 1400 according to an embodiment of this application. The server 1400 may vary greatly due to different configurations or performance, and may include one or more central processing units (CPUs) 1422 (for example, one or more processors) and a memory 1432, and one or more storage media 1430 (for example, one or more mass storage devices) that store application programs 1442 or data 1444. The memory 1432 and the storage medium 1430 may implement transient storage or permanent storage. The program stored in the storage medium 1430 may include one or more modules (not shown in the figure), and each module may include a series of instruction operations on the server. Furthermore, the CPU 1422 may be configured to communicate with the storage medium 1430, and perform, on the server 1400, the series of instruction operations in the storage medium 1430.

The server 1400 may further include one or more power supplies 1426, one or more wired or wireless network interfaces 1450, one or more input/output interfaces 1458, and/or one or more operating systems 1441 such as Windows Server™, Mac OS X™, Unix™, Linux™, and FreeBSD™.

The steps performed by the server in the foregoing embodiments may be implemented based on the server structure shown in FIG. 14.

An embodiment of this application further provides a computer-readable storage medium, configured to store program code, the program code being used for performing the AI-based animation character control and drive method according to the foregoing embodiments.

An embodiment of this application further provides a computer program product including instructions, the instructions, when being run on a computer, causing the computer to perform the AI-based animation character control and drive method according to the foregoing embodiments.

The foregoing embodiments are merely intended for describing the technical solutions of this application, but not for limiting this application. Although this application is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of this application.

What is claimed is:

1. An animation character control method, performed by a processing device, the method comprising:
    obtaining a driving expression base with a first set of multiple basis components corresponding to a driving character and a driven expression base with a second set of multiple basis components corresponding to a driven character, the driving expression base being different from the driven expression base, the driving character having a corresponding face customization base, the driven character having no corresponding face customization base, wherein an expression base for a character of a character type is formed by deformable meshes representing different expressions for the character type whereas a customization base for the character is formed by deformable meshes representing different facial shapes of the character type;
    determining a mapping relationship between an expression parameter corresponding to the driving character in the driving expression basis and an expression parameter corresponding to the driven character in the driven expression base, wherein the expression parameter represents weighting coefficients of deformable meshes representing different expressions in the driving or driven expression base; and
    controlling the driven character according to the expression parameter corresponding to the driving character, the driven expression basis, the face customization base of the driving character, and the mapping relationship, without relying on the face customization base of the driven character.

2. The method according to claim 1, wherein:
    the driving character is a character having the corresponding face customization base among a first character and a second character, and the driven character is a character that has no corresponding face customization base among the first character and the second character; and
    determining the mapping relationship between the expression parameter corresponding to the driving character and the expression parameter corresponding to the driven character according to the driving expression base and the second expression base comprises:
        determining a target mesh according to a first expression parameter and a first expression base corresponding to the first character, the first expression parameter being used for driving a first quantity of dimensions of the first expression base, the target mesh having a target vertex topology used for identifying the first character that makes an expression corresponding to the first expression parameter;
        obtaining a target expression base corresponding to the first character having the target vertex topology and having a second quantity of dimensions, the target expression base being determined according to a second expression base corresponding to the second character;
        determining a second expression parameter corresponding to the first character according to the target mesh and the target expression base, the second expression parameter being used to reflect a change degree of the expression of the first character relative to the target mesh; and
        determining the mapping relationship between the expression parameter corresponding to the driving character and the expression parameter corresponding to the driven character according to the first expression parameter and the second expression parameter.

3. The method according to claim 2, wherein:
    the target vertex topology is a second vertex topology corresponding to the second expression base; and
    determining the target mesh according to the first expression parameter and the first expression base corresponding to the first character comprises:
        determining an initial mesh according to the first expression parameter and the first expression base corresponding to the first character, the initial mesh having a first vertex topology corresponding to the first expression base; and
        generating the target mesh according to a correspondence between the first vertex topology and the second vertex topology.

4. The method according claim 3, wherein obtaining the target expression base corresponding to the first character having the target vertex topology comprises:
    determining an expressionless mesh corresponding to the first character with no expression from the first expression base, and determining an expressionless mesh corresponding to the second character with no expression from the second expression base;

determining an adjustment mesh according to the expressionless mesh corresponding to the first character and the expressionless mesh corresponding to the second character, the adjustment mesh having the second vertex topology used for identifying the first character being expressionless; and generating the target expression base according to the adjustment mesh and a mesh deformation relationship in the second expression base.

5. The method according to claim 4, wherein:

the first character has no corresponding face customization base, the second character has a corresponding face customization base, and the first expression parameter is a random expression parameter; or the first character has a corresponding face customization base, and the second character has no corresponding face customization base.

6. The method according to claim 2, wherein:

the target vertex topology is a second vertex topology corresponding to the second expression base;

determining the target mesh according to the first expression parameter and the first expression base corresponding to the first character comprises:

determining an expressionless mesh corresponding to the second character with no expression from the second expression base corresponding to the second character;

determining, according to the expressionless mesh corresponding to the second character and the first expression base corresponding to the first character, an adjustment expression base corresponding to the first character having the second vertex topology, a quantity of dimensions of the adjustment expression base being the first quantity of dimensions; and determining the target mesh according to the first expression parameter and the adjustment expression base; and obtaining the target expression base corresponding to the first character having the target vertex topology comprises:

determining an expressionless mesh corresponding to the first character with no expression from the adjustment expression base; and generating the target expression base according to the expressionless mesh corresponding to the first character and a mesh deformation relationship in the second expression base.

7. The method according to claim 2, wherein determining the mapping relationship between the expression parameter corresponding to the driving character and the expression parameter corresponding to the driven character according to the first expression parameter and the second expression parameter comprises:

obtaining a plurality of first expression parameters and a plurality of second expression parameters in pairs; and determining the mapping relationship according to a first matrix formed by the plurality of first expression parameters and a second matrix formed by the plurality of second expression parameters.

8. The method according to claim 1, wherein determining a mapping relationship between the expression parameter corresponding to the driving character and the expression parameter corresponding to the driven character according to the driving expression base and the driven expression base comprises:

determining first point cloud data corresponding to the driving character according to the driving expression base and the expression parameter corresponding to the driving character;

determining second point cloud data corresponding to the driven character according to the driven expression base and the expression parameter corresponding to the driven character;

determining a conversion parameter of the first point cloud data and the second point cloud data, the conversion parameter being used for identifying a conversion relationship between the second point cloud data and the first point cloud data; and determining the mapping relationship between the expression parameter corresponding to the driving character and the expression parameter corresponding to the driven character according to the first point cloud data, the second point cloud data, and the conversion parameter.

9. A non-transitory computer-readable storage medium, configured to store program code, the program code being used for performing the method according to claim 1.

10. An animation character control method, performed by a processing device, the method comprising:

obtaining a driving deformation base with a first set of multiple basis components corresponding to a driving character and a driven deformation base with a second set of multiple basis components corresponding to a driven character, the driving deformation base being different from the driven deformation base, the driving character having a corresponding structural base, the driven character having no corresponding structural base, the structural base being used for identifying structural features of a corresponding character, and the deformation base being used for identifying deformation features of a corresponding character, wherein a deformation base for a character of a character type is formed by deformable meshes representing different deformations for the character type whereas a structural base for the character is formed by deformable meshes representing different structural shapes of the character type;

determining a mapping relationship between a deformation parameter corresponding to the driving character in the driving deformation basis and a deformation parameter corresponding to the driven character the driven deformation base, wherein the deformation parameter represents weighting coefficients of deformable meshes representing different deformations in the driving or driven deformation base; and controlling the driven character according to the deformation parameter corresponding to the driving character, the driven deformation basis, the face customization base of the driving character, and the mapping relationship, without relying on the structural base of the driven character.

11. An animation character control apparatus, comprising a memory for storing computer instructions and a processor configured to execute the computer instructions to perform the method of claim 10.

12. An animation character control apparatus, comprising a memory for storing computer instructions and a processor configured to execute the computer instructions to:

obtain a driving expression base with a first set of multiple basis components corresponding to a driving character and a driven expression base with a second set of multiple basis components corresponding to a driven character, the driving expression base being different from the driven expression base, the driving character having a corresponding face customization base, the driven character having no corresponding face customization base, wherein an expression base for a character of a character type is formed by deformable meshes representing different expressions for the character type whereas a customization base for the character is formed by deformable meshes representing different facial shapes of the character type;

determine a mapping relationship between an expression parameter corresponding to the driving character in the first expression basis and an expression parameter corresponding to the driven character in the driven expression base, wherein the expression parameter represents weighting coefficients of deformable meshes representing different expressions in the driving or driven expression base; and control the driven character according to the expression parameter corresponding to the driving character, the second expression basis, the face customization base of the driving character, and the mapping relationship without relying on the face customization base of the driven character.

13. The apparatus according to claim 12, wherein:
the driving character is a character having the corresponding face customization base in a first character and a second character, and the driven character is a character that has no corresponding face customization base among the first character and the second character; and
to determine the mapping relationship comprises:
  determine a target mesh according to a first expression parameter and a first expression base corresponding to the first character, the first expression parameter being used for driving a first quantity of dimensions of the first expression base, the target mesh having a target vertex topology used for identifying the first character that makes an expression corresponding to the first expression parameter;
  obtain a target expression base corresponding to the first character having the target vertex topology and having a second quantity of dimensions, the target expression base being determined according to a second expression base corresponding to the second character;
  determine a second expression parameter corresponding to the first character according to the target mesh and the target expression base, the second expression parameter being used to reflect a change degree of the expression of the first character relative to the target mesh; and
  determine the mapping relationship between the expression parameter corresponding to the driving character and the expression parameter corresponding to the driven character according to the first expression parameter and the second expression parameter.

14. The apparatus according to claim 13, wherein:
the target vertex topology is a second vertex topology corresponding to the second expression base; and
the processor is further configured to execute the computer instructions to:
  determine an initial mesh according to the first expression parameter and the first expression base corresponding to the first character, the initial mesh having a first vertex topology corresponding to the first expression base; and
  generate the target mesh according to a correspondence between the first vertex topology and the second vertex topology.

15. The apparatus according to claim 14, wherein the processor is further configured to execute the computer instructions to:
  determine an expressionless mesh corresponding to the first character with no expression from the first expression base, and determine an expressionless mesh corresponding to the second character with no expression from the second expression base;
  determine an adjustment mesh according to the expressionless mesh corresponding to the first character and the expressionless mesh corresponding to the second character, the adjustment mesh having the second vertex topology used for identifying the first character being expressionless; and
  generate the target expression base according to the adjustment mesh and a mesh deformation relationship in the second expression base.

16. The apparatus according to claim 13, wherein:
the target vertex topology is a second vertex topology corresponding to the second expression base; and
the processor is further configured to execute the computer instructions to:
  determine an expressionless mesh corresponding to the second character with no expression from the second expression base corresponding to the second character;
  determine, according to the expressionless mesh corresponding to the second character and the first expression base corresponding to the first character, an adjustment expression base corresponding to the first character having the second vertex topology, a quantity of dimensions of the adjustment expression base being the first quantity of dimensions;
  determine the target mesh according to the first expression parameter and the adjustment expression base;
  determine an expressionless mesh corresponding to the first character with no expression from the adjustment expression base; and
  generate the target expression base according to the expressionless mesh corresponding to the first character and a mesh deformation relationship in the second expression base.

17. The apparatus of claim 13, wherein:
the first character has no corresponding face customization base, the second character has a corresponding face customization base, and the first expression parameter is a random expression parameter; or
the first character has a corresponding face customization base, and the second character has no corresponding face customization base.

18. The apparatus of claim 13, wherein, to determine the mapping relationship, the processor is further configured to execute the computer instructions to:
  obtain a plurality of first expression parameters and a plurality of second expression parameters in pairs; and
  determine the mapping relationship according to a first matrix formed by the plurality of first expression parameters and a second matrix formed by the plurality of second expression parameters.

19. The apparatus of claim 12, wherein, to determine the mapping relationship, the processor is further configured to execute the computer instructions to:

determine first point cloud data corresponding to the driving character according to the driving expression base and the expression parameter corresponding to the driving character;
determine second point cloud data corresponding to the driven character according to the driven expression base and the expression parameter corresponding to the driven character;
determine a conversion parameter of the first point cloud data and the second point cloud data, the conversion parameter being used for identifying a conversion relationship between the second point cloud data and the first point cloud data; and
determine the mapping relationship between the expression parameter corresponding to the driving character and the expression parameter corresponding to the driven character according to the first point cloud data, the second point cloud data, and the conversion parameter.

* * * * *